(12) United States Patent
Saha et al.

(10) Patent No.: US 12,289,614 B2
(45) Date of Patent: Apr. 29, 2025

(54) WIRELESS SIGNAL TRANSMITTER PARAMETER DETERMINATION

(71) Applicant: The Research Foundation for the State University of New York, Albany, NY (US)

(72) Inventors: Dola Saha, Albany, NY (US); Aveek Dutta, Albany, NY (US); Maqsood Abdul Careem, Albany, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 328 days.

(21) Appl. No.: 17/659,440

(22) Filed: Apr. 15, 2022

(65) Prior Publication Data

US 2022/0353697 A1 Nov. 3, 2022

Related U.S. Application Data

(60) Provisional application No. 63/175,324, filed on Apr. 15, 2021.

(51) Int. Cl.
| | |
|---|---|
| *H04W 4/00* | (2018.01) |
| *H04W 8/00* | (2009.01) |
| *H04W 16/28* | (2009.01) |
| *H04W 64/00* | (2009.01) |
| *H04W 84/06* | (2009.01) |

(52) U.S. Cl.
CPC .......... *H04W 16/28* (2013.01); *H04W 8/005* (2013.01); *H04W 64/006* (2013.01); *H04W 84/06* (2013.01)

(58) Field of Classification Search
CPC ... H04W 16/28; H04W 8/005; H04W 64/006; H04W 84/06; H04W 8/00; H04W 64/00
USPC .................................................. 370/329
See application file for complete search history.

(56) References Cited

U.S. PATENT DOCUMENTS

| | | | |
|---|---|---|---|
| 10,411,356 B2 * | 9/2019 | Johnson | H01Q 3/34 |
| 10,601,494 B2 * | 3/2020 | Vannucci | H04W 16/28 |
| 10,938,108 B2 * | 3/2021 | Henry | H01Q 25/007 |
| 11,032,819 B2 * | 6/2021 | Gerszberg | H04B 7/022 |

(Continued)

OTHER PUBLICATIONS

Ettus Research, "USRP B200mini-I" Ettus Research Products, 2022, National Instruments, Austin, TX, USA.

(Continued)

*Primary Examiner* — Marceau Milord
(74) *Attorney, Agent, or Firm* — Lance Reich; Peter Fallon

(57) ABSTRACT

Methods, computer program products, and systems can include, for example: receiving a plurality of signal instances of a signal emitted by a transmitter, wherein respective signal instances of the plurality of signal instances are collected at different positions. There is also set forth herein receiving by a movable receiver moving within a first location a plurality of signal instances of a signal emitted by a transmitter, wherein signal instances defining the plurality of signal instances are collected by the moveable receiver at different respective receiver positions within the first location. There is also set forth herein discovering a direction of arrival parameter value that specifies a direction of arrival of the signal emitted by the transmitter, wherein the discovering includes using a set of signal instances from the plurality of signal instances.

17 Claims, 15 Drawing Sheets

(56) References Cited

U.S. PATENT DOCUMENTS

| | | | | |
|---|---|---|---|---|
| 2010/0302014 | A1* | 12/2010 | Gloo | G01S 5/04 |
| | | | | 33/355 R |
| 2015/0031345 | A1* | 1/2015 | Hyde | H04L 41/0803 |
| | | | | 455/418 |
| 2018/0077709 | A1* | 3/2018 | Gerszberg | H04B 3/54 |
| 2018/0166784 | A1* | 6/2018 | Johnson | H01Q 9/0485 |
| 2018/0166785 | A1* | 6/2018 | Henry | H01Q 25/007 |
| 2018/0167130 | A1* | 6/2018 | Vannucci | H01Q 5/22 |
| 2020/0059755 | A1* | 2/2020 | Kabiri | G01S 3/043 |
| 2022/0082707 | A1* | 3/2022 | Goodrum | G01S 19/08 |
| 2022/0248340 | A1* | 8/2022 | Miyatake | H04W 16/28 |

OTHER PUBLICATIONS

SparkFun, "SparkFun GPS-RTK Board—NEO-M8P-2 (Qwiic)" Sparkfun Electronics, Niwot, Colorado, USA.

U-Blox, "Neo-m8p series: u-blox m8 high precision gnss modules" u-blox, Thalwil, Switzerland.

Sigfox, *Sigfox, the world's leading IOT services provider.*, Sigfox, Labège, France.

Commission 4: Positioning & Applications, Sub-Commission 4.5: Next Generation RTK, *Working Group 4.5.1: Network RTK*, International Association of Geodesy, Germany.

Seyed A. (Reza) Zekavat and R. Michael Buehrer, *Handbook of Position Location: Theory, Practice and Advances*, Oct. 25, 2011, 1st ed. Wiley-IEEE Press, USA.

Francesco Betti Sorbelli, Sajal K. Das, Cristina M. Pinotti, and Simone Silvestri, "Precise Localization in Sparse Sensor Networks using a Drone with Directional Antennas" *Proceedings of the 19th International Conference on Distributed Computing and Networking*, Jan. 4, 2018, pp. 1-10, ICDCN '18 Article 34, ACM, New York, NY, USA.

Oka Danil Saputra, Mohammad Irfan, Nadea Nabilla Putri, and Soo Young Shin, "UAV-based localization for distributed tactical wireless networks using archimedean spiral" *2015 International Symposium on Intelligent Signal Processing and Communication Systems (ISPACS)*, Nov. 2015, pp. 392-396, IEEE, Nusa Dua Bali, Indonesia.

Xu Sheng, Lu Yafei, Hou Zhongxi, Shan Shangqiu, and Guo Zheng, "Passive geo-location for ground target with multiple measurements using fixed wing UAV" *2016 IEEE Chinese Guidance, Navigation and Control Conference (CGNCC)*, Aug. 2016, pp. 2477-2482, IEEE, Nanjing, China.

Seyyed M. Mehdi Dehghan and Hadi Moradi, "A new approach for Simultaneous Localization of UAV and RF Sources (SLUS)" *2014 International Conference on Unmanned Aircraft Systems (ICUAS)*, May 2014, pp. 744-749, IEEE, Orlando, FL, USA.

Orhan Eroglu and Guray Yilmaz "A novel fast and accurate algorithm for Terrain Referenced UAV localization" 2013 International Conference on Unmanned Aircraft Systems (ICUAS), May 2013, pp. 660-667, IEEE, Atlanta, GA, USA.

Aziz Altaf Khuwaja, Yunfei Chen, Nan Zhao, Mohamed-Slim Alouini, and Paul Dobbins "A Survey of Channel Modeling for UAV Communications" *IEEE Communications Surveys Tutorials*, Jul. 16, 2018, pp. 2804-2821, vol. 20, Issue 4, Fourthquarter 2018, IEEE, USA.

Benjamin Friedlander, "A sensitivity analysis of the MUSIC algorithm" *IEEE Transactions on Acoustics, Speech, and Signal Processing*, Oct. 1990, pp. 1740-1751, vol. 38, Issue 10, IEEE, USA.

"GPS Satellite Navigation—WAAS" *Federal Aviation Administration*, Dec. 2016, FAA, USA.

Ioannis Pefkianakis and Kyu-Han Kim, "Accurate 3D Localization for 60 GHz Networks" *Proceedings of the 16th ACM Conference on Embedded Networked Sensor Systems*, Nov. 4, 2018, pp. 120-131, SenSys '18, ACM, New York, NY, USA.

Hideki Ochiai, Patrick Mitran, H. Vincent Poor, and Vahid Tarokh, "Collaborative beamforming for distributed wireless ad hoc sensor networks" *IEEE Transactions on Signal Processing*, Oct. 17, 2005, pp. 4110-4124, vol. 53, Issue 11, Nov. 2005, IEEE, USA.

Raghuraman Mudumbai, Gwen Barriac, and Upamanyu Madhow, "On the Feasibility of Distributed Beamforming in Wireless Networks" *IEEE Transactions on Wireless Communications*, May 21, 2007, pp. 1754-1763, vol. 6, Issue 5, May 2007, IEEE, USA.

M. C. Vanderveen, Constantinos Papadias, and Arogyaswami Paulraj, "Joint angle and delay estimation (JADE) for multipath signals arriving at an antenna array" *IEEE Communications Letters*, Jan. 1997, pp. 12-14, vol. 1 Issue 1, Jan. 1997, IEEE, USA.

Kehu Yang, Gang Wang, and Zhi-Quan Luo, "Efficient Convex Relaxation Methods for Robust Target Localization by a Sensor Network Using Time Differences of Arrivals" *IEEE Transactions on Signal Processing*, Mar. 10, 2009, pp. 2775-2784, vol. 57, Issue 7, Jul. 2009, IEEE, USA.

Hong Shen, Zhi Ding, Soura Dasgupta, and Chunming Zhao, "Multiple Source Localization in Wireless Sensor Networks Based on Time of Arrival Measurement" *IEEE Transactions on Signal Processing*, Feb. 4, 2014, pp. 1938-1949, vol. 62, Issue 8, Apr. 15, 2014, IEEE, USA.

Jiyan Huang, Peng Wang, and Qun Wan, "Collaborative Beamforming for Wireless Sensor Networks with Arbitrary Distributed Sensors" *IEEE Communications Letters*, May 15, 2012, pp. 1118-1120, vol. 16, Issue 7, Jul. 2012, IEEE, USA.

Anne Ferreol, Pascal Larzabal, and Mats Viberg, "On the asymptotic performance analysis of subspace DOA estimation in the presence of modeling errors: case of Music" *IEEE Transactions on Signal Processing*, Feb. 21, 2006, pp. 907-920, vol. 54, Issue 3, Mar. 2006, IEEE, USA.

Ettus Research, "Usrp b200 and b210 product overview" 2019, Ettus Research, Santa Clara, CA, USA.

Petros Koutoupis, "The linux ram disk,." [Online]. Available: http://petroskoutoupis.com/lib/PetrosKoutoupis_EN42009.pdf.

Sergey Loyka and Ammar Kouki, "Using two ray multipath model for microwave link budget analysis," *IEEE Antennas and Propagation Magazine*, Oct. 2001, pp. 31-36, vol. 43, Issue 5, Oct. 2001, IEEE, USA.

E. Bregu, N. Casamassima, D. Cantoni, L. Mottola, and K. Whitehouse, "Reactive control of autonomous drones" *Proceedings of the 14th Annual International Conference on Mobile Systems, Applications, and Services*, Jun. 2016, pp. 207-219, MobiSys '16, Association for Computing Machinery (ACM), New York, NY USA.

R. Schmidt, "Multiple emitter location and signal parameter estimation" *IEEE Transactions on Antennas and Propagation*, Mar. 1986, pp. 276-280, vol. 34, No. 3, IEEE, USA.

Jie Xiong and Kyle Jamieson, "Arraytrack: A fine-grained indoor location system" *Proceedings of the 10th USENIX conference on Networked Systems Design and Implementation*, Apr. 2013, pp. 71-84, nsdi'13, ACM, Berkeley, CA USA.

Jie Xiong, Karthikeyan Sundaresan, and Kyle Jamieson, "ToneTrack: Leveraging Frequency-Agile Radios for Time-Based Indoor Wireless Localization" *Proceedings of the 21st Annual International Conference on Mobile Computing and Networking*, Sep. 2015, pp. 537-549, MobiCom '15, ACM, New York, NY USA.

Manikanta Kotaru, Kiran Joshi, Dinesh Bharadia, and Sachin Katti, "SpotFi: Decimeter Level Localization Using WiFi" *Proceedings of the 2015 ACM Conference on Special Interest Group on Data Communication*, Aug. 2015, pp. 269-282, SIGCOMM Comput. Commun. Rev '15 vol. 45, No. 4, ACM, Stanford, CA USA.

Swarun Kumar, Stephanie Gil, Dina Katabi, and Daniela Rus, "Accurate indoor localization with zero start-up cost" *Proceedings of the 20th annual international conference on Mobile computing and networking*, Sep. 7, 2014, pp. 483-494, MobiCom '14, ACM, New York, NY USA.

Yunfei Ma, Nicholas Selby, and Fadel Adib, "Drone Relays for Battery-Free Networks" *Proceedings of the Conference of the ACM Special Interest Group on Data Communication*, Aug. 2017, pp. 335-347, SIGCOMM '17, ACM, New York, NY USA.

Deepak Vasisht, Swarun Kumar, and Dina Katabi, "Decimeter-Level Localization with a Single WiFi Access Point" *13th USENIX Symposium on Networked Systems Design and Implementation*, Mar. 2016, pp. 165-178, NDSI '16, USENIX Association, Santa Clara, CA USA.

Alex T. Mariakakis, Souvik Sen, Jeongkeun Lee, and Kyu-Han Kim, "Sail: Single access point-based indoor localization" *Proceed-*

(56) References Cited

OTHER PUBLICATIONS

*ings of the 12th Annual International Conference on Mobile Systems, Applications, and Services*, Jun. 2014, pp. 315-328, MobiSys '14, ACM, New York, NY, USA.

Sebastian Sadowski and Petros Spachos, "Rssi-Based Indoor Localization With the Internet of Things," *IEEE Access*, Jun. 4, 2018, pp. 30149-30161, vol. 6, IEEE, USA.

Mohammad Mozaffari, Walid Saad, Mehdi Bennis, Young-Han Nam, and Merouane Debbah, "A Tutorial on UAVs for Wireless Networks: Applications, Challenges, and Open Problems", CoRR, Mar. 2, 2018, vol. abs/1803.00680, arXiv, USA.

Maqsood Ahamed Abdul Careem, Jorge Gomez, Dola Saha, and Aveek Dutta, "HiPER-V: A High Precision Radio Frequency Vehicle for Aerial Measurements" IEE Xplore, Sep. 5, 2019, pp. 1-6, 2019 16th Annual IEEE International Conference on Sensing, Communication, and Networking (SECON), IEEE, Boston, MA USA.

Ashutosh Dhekne, Ayon Chakraborty, Karthikeyan Sundaresan, and Sampatii Rangarajan, "TrackIO: Tracking First Responders Inside-Out" *Proceedings of the 16th USENIX Conference on Networked Systems Design and Implementation*, Feb. 2019, pp. 751-764, NSDI '19, USENIX Association, Boston, MA USA.

Aveek Purohit, Zheng Sun, Frank Mokaya, and Pei Zhang, "SensorFly: Controlled-mobile sensing platform for indoor emergency response applications" *IEEE Xplore*, Apr. 2011, pp. 223-234, Proceedings of the 10th ACM/IEEE International Conference on Information Processing in Sensor Networks, IEEE, Chicago, IL USA.

Ayon Chakraborty, Eugene Chai, Karthikeyan Sundaresan, Amir Khojastepour, and Sampath Rangarajan, "SkyRAN: a self-organizing LTE RAN in the sky" *Proceedings of the 14th International Conference on Emerging Networking Experiments and Technologies*, Dec. 4, 2018, pp. 280-292, CoNEXT '18, ACM, USA.

Jesus Garza, Marco A. Panduro, Alberto Reyna, Gerardo Romero, and Carlos del Rio, "Design of UAVs-Based 3D Antenna Arrays for a Maximum Performance in Terms of Directivity and SLL" *International Journal of Antennas and Propagation*, Aug. 30, 2016, vol. 2016, Hindawi, Egypt.

Zhongli Liu, Yinjie Chen, Benyuan Liu, Chengyu Cao, and Xinwen Fu, "HAWK: An unmanned mini helicopter-based aerial wireless kit for localization" IEEE Transactions on Mobile Computing, Feb. 2014, pp. 287-298, vol. 14 No. 2, IEEE, USA.

Sriramya Bhamidipati and Grace Xingxin Gao, "Locating Multiple GPS Jammers Using Networked UAVs" *IEEE Internet of Things Journal*, Jan. 30, 2019, pp. 1, vol. 6 Issue 2, IEEE, USA.

Kiran Joshi, Steven Hong, and Sachin Katti, "PinPoint: Localizing Interfering Radios" *Proceedings of the 10th USENIX Conference on Networked Systems Design and Implementation*, Apr. 2, 2013, pp. 241-254, nsdi '13, USENIX Association, Berkeley, CA, USA.

Bernhard Großwindhager, Michael Rath, Josef Kulmer, Mustafa S. Bakr, Carlo Alberto Boano, Klaus Witrisal, and Kay Römer, "SALMA: UWB-based Single-Anchor Localization System using Multipath Assistance" *Proceedings of the16th ACM Conference on Embedded Networked Sensor Systems*, Nov. 4, 2018, pp. 132-144, SenSys '18, ACM, New York, NY, USA.

Rajalakshmi Nandakumar, Vikram Iyer, and Shyamnath Gollakota, "3D Localization for Sub-Centimeter Sized Devices" *Proceedings of the 16th ACM Conference on Embedded Networked Sensor Systems*, Nov. 4, 2018, pp. 108-119, SenSys '18, ACM, New York, NY, USA.

Lingkun Li, Pengjin Xie, and Jiliang Wang "RainbowLight: Design and Implementation of a Low Cost Ambient Light Positioning System" *Proceedings of the 24th Annual International Conference on Mobile Computing and Networking*, Oct. 2018, pp. 807-809, MobiCom '18, ACM, New York, NY USA.

IEEE Computer Society LAN/MAN Standards Committee "Part 11: Wireless Local Area Network (LAN) Medium Access Control (MAC) and Physical Layer (PHY) Specifications" *IEEE Standard forInformation technology—Telecommunications and information exchange between systems—Local and metropolitan area networks—Specific requirements*, Jun. 12, 2007, IEEE Std 802.11™-2007, IEEE, New York, NY. USA.

Semtech Corporation, *AN1200.22 LoRa™ Modulation Basics*, May 2, 2015, Revision 2, Semtech Corporation, Camarillo, CA, USA.

Essam Sourour, Hussein El-Ghoroury, and Dale McNeill, "Frequency offset estimation and correction in the IEEE 802.11a WLAN" *IEEE 60th Vehicular Technology Conference*, 2004. VTC2004-Fall. 2004, Sep. 2004, pp. 4923-4927, vol. 7, IEEE, Los Angeles, CA, USA.

David Arthur and Sergei Vassilvitskii, "k-means++: The advantages of careful seeding," *Proceedings of the Eighteenth Annual ACM-SIAM Symposium on Discrete Algorithms*, Jan. 7, 2007, pp. 1027-1035, SODA '07, Society for Industrial and Applied Mathematics, Philadelphia, PA, USA.

Raj Jain, *Channel Models A Tutorial*, Feb. 21, 2007, pp. 1-21, V1.0, Washington University in St. Louis, St. Louis, Missouri, USA.

Hamid Krim and Mats Viberg, "Two decades of array signal processing research: the parametric approach," *IEEE Signal Processing Magazine*, Jul. 1996, pp. 67-94, vol. 13, Issue Jul. 4, 1996, IEEE, USA.

Manohar N. Murthi and Bhaskar D. Rao, "Minimum variance distortionless response (MVDR) modeling of voiced speech" *1997 IEEE International Conference on Acoustics, Speech, and Signal Processing*, Apr. 1997, pp. 1687-1690 vol. 3, IEEE, Munich, Germany.

R. Roy and Thomas Kailath, "ESPRIT-estimation of signal parameters via rotational invariance techniques" *IEEE Transactions on Acoustics, Speech and Signal Processing*, Jul. 1989, pp. 984-955, vol. 37, Issue 7, Jul. 1989, IEEE, USA.

Jeffrey A. Fessler and Alfred O. Hero, "Space-alternating generalized expectation-maximization algorithm" *IEEE Transactions on Signal Processing*, Oct. 1994, pp. 2664-2677, vol. 42, Issue 10, Oct. 1994, IEEE, USA.

Christoph Stoeckle, Jawad Munir, Amine Mezghani, and Josef A. Nossek, "DoA Estimation Performance and Computational Complexity of Subspace- and Compressed Sensing-based Methods" *WSA 2015; 19th International ITG Workshop on Smart Antennas*, Mar. 2015, pp. 1-6, VDE, Ilmenau, Germany.

Muhammad M. Rahman, Henry E. Baidoo-Williams, Raghuraman Mudumbai, and Soura Dasgupta, "Fully wireless implementation of distributed beamforming on a software-defined radio platform" *2012 ACM/IEEE 11th International Conference on Information Processing in Sensor Networks (IPSN)*, Apr. 2012, pp. 305-315, IEEE, Beijing, China.

Qingjiang Shi, Chen He, Hongyang Chen, and Lingge Jiang, "Distributed Wireless Sensor Network Localization Via Sequential Greedy Optimization Algorithm" *IEEE Transactions on Signal Processing*, Mar. 11, 2010, pp. 3328-3340, vol. 58, Issue 6, Jun. 2010, IEEE, USA.

Hua-Jie Shao, Xiao-Ping Zhang, and Zhi Wang, "Efficient Closed-Form Algorithms for AOA Based Self-Localization of Sensor Nodes Using Auxiliary Variables" *IEEE Transactions on Signal Processing*, Mar. 26, 2014, pp. 2580-2594, vol. 62, Issue 10, May 15, 2014, IEEE, USA.

Mohammed F. A. Ahmed and Sergiy A. Vorobyov, "Collaborative beamforming for wireless sensor networks with Gaussian distributed sensor nodes" *IEEE Transactions on Wireless Communications*, Feb. 20, 2009, pp. 638-643, vol. 8, Issue 2, Feb. 2009, IEEE, USA.

Oliver Bachem, Mario Lucic, S. Hamed Hassani, and Andreas Krause, "Approximate k-means++ in sublinear time" *Proceedings of the Thirtieth AAAI Conference on Artificial Intelligence*, Feb. 12, 2016, pp. 1459-1467, AAAI'16, AAAI Press, Phoenix, Arizona, USA.

Intel, *Intel® Aero Compute Board Hardware Features and Usage*, 2017, pp. 1-19, Rev 1.5.2, Intel, Santa Clara, CA, USA.

Dronecode "RTK GPS" *PX4 Autopilot User Guide*, Apr. 27, 2022, The Dronecode Project, USA.

Jansen Liando, Amalinda Gamage, Agustinus W. Tengourtius, and Mo Li, "Known and Unknown Facts of LoRa: Experiences from a Large-scale Measurement Study" *ACM Transactions on Sensor Networks*, Feb. 21, 2019, pp. 1-35, vol. 15, Issue 2, May 2019, ACM, USA.

Federal Aviation Administration "Small Unmanned Aircraft Systems (UAS) Regulations (Part 107)" Oct. 6, 2020, FAA, USA.

(56) References Cited

OTHER PUBLICATIONS

Adafruit, "Adafruit Feather MO with RFM95 LoRa Radio—900MHz—RadioFruit" Adafruit Industries, New York, NY, USA.
Maqsood Ahamed Abdul Careem, Jorge Gomez, Dola Saha, and Aveek Dutta, "RFEye in the Sky" *IEEE Transactions on Mobile Computing*, Nov. 18, 2020, pp. 2566-2580, vol. 21, Issue 7, IEEE, USA (submitted with Abstract by publisher).

\* cited by examiner (b) Clustering of DoA (a) Beampattern with side lobes (a) DoA accuracy at various UAV altitudes (b) Localization accuracy at various UAV altitudes

WIRELESS SIGNAL TRANSMITTER PARAMETER DETERMINATION

CROSS-REFERENCE TO RELATED APPLICATIONS

This application claims the benefit of priority of U.S. Provisional Application No. 63/175,324 filed Apr. 15, 2021, titled "Systems, Methods, and Program Products for Determining Location of Unknown Wireless Transmitters", which is incorporated by reference herein in its entirety.

BACKGROUND

This disclosure in one aspect relates generally to parameter determination and specifically to parameter determination for a wireless signal transmitter.

The disclosure in one aspect relates generally to signal detection, and more particularly, to a systems, methods, and program products for determining a location of one or more unknown wireless signal transmitters, independent of waveform.

Localization refers to determining location coordinates of a node including a wireless signal transmitter and/or wireless signal receiver. Localization can employ such principles as trilateration, triangulation, and/or maximum likelihood multilateration. Determining of a localization parameter value for a node can include determination and use of other parameter values. Localization methods can include, e.g., Angle of Arrival (AoA), Time of Arrival (ToA), and/or Received Signal Strength (RSS).

BRIEF DESCRIPTION

An aspect of the disclosure comprises a method, wherein the method includes receiving by a movable receiver moving within a first location a plurality of signal instances of a signal emitted by a transmitter, wherein signal instances defining the plurality of signal instances are collected by the moveable receiver at different respective receiver positions within the first location; and discovering, for the first location, a direction of arrival parameter value that specifies a direction of arrival of the signal emitted by the transmitter, wherein the discovering includes using a set of signal instances from the plurality of signal instances.

Another aspect of the disclosure comprises a method, wherein the method includes receiving a plurality of signal instances of a signal emitted by a transmitter, wherein respective signal instances of the plurality of signal instances are collected at different positions; and discovering a plurality of direction of arrival parameter values that respectively specify a direction of arrival of the signal emitted by the transmitter, wherein the discovering includes using multiple sets of signal instances from the plurality of signal instances; examining the plurality of direction of arrival parameter values; and determining a direction of arrival of the signal emitted by the transmitter in dependence on the clustering analysis.

Another aspect of the disclosure provides a computer implemented wireless receiver system, including at least one computer processor in data communication with one or more non-transitory computer-readable media including computer software configured to execute operation of the computer implemented wireless receiver system and to determine a location of one or more unknown wireless signal transmitters, independent of waveform, when the computer software is executed on the at least one computer processor, the computer implemented wireless receiver system including: one or more motile, mobile or portable wireless receiver antenna platforms, each wireless receiver antenna platform equipped with one or more wireless receiver antennas electrically connected to a power supply; one or more position sensors, wherein the wireless receiver system uses the position sensors to measure, record, and track a position of the wireless receiver antenna platforms; code executing detection and acquisition, by the wireless receiver system, of one or more signals emitted by the one or more unknown wireless signal transmitters, wherein the wireless receiver system executes detection and acquisition of the signal from two or more uncoordinated, or non-precalculated, positions located within one or more volumes defined by the wireless receiver system; code executing emulation of a distributed virtual phased receiver antenna array that combines one or more measured positions of the one or more wireless receiver antenna platforms or wireless receiver antennas and temporal realignment of each of the one or more signals to compute a beamforming pattern for the respective signal; code executing computation, by the wireless receiver system, of an asynchronous distributed receiver beamforming pattern along an azimuth and an elevation at the one or more motile, mobile or portable antenna platforms; and code executing calculation of a direction of arrival (DoA), based on the asynchronous distributed receiver beamforming pattern, for each of the one or more signals emitted from each of the one or more unknown wireless signal transmitters.

Another aspect of the disclosure provides a method for operating a wireless receiver system and determining a location of one or more unknown wireless signal transmitters, independent of waveform, wherein various process steps of the method are executed by one or more computers, including at least one computer processor in data communication with one or more non-transitory computer-readable media containing computer software code including computer-readable instructions that, when executed by the at least one computer processor, are configured to operate the wireless receiver system and determine the location of one or more unknown wireless signal transmitters, the steps of the method including: providing one or more motile, mobile or portable wireless receiver antenna platforms, each wireless receiver antenna platform equipped with one or more wireless receiver antennas electrically connected to a power supply; optionally, mapping or cataloging a set of one or more zones, e.g., areas or volumes, of interest prior to performing a signal localization protocol; transporting one or more of the motile, mobile or portable wireless receiver antenna platforms to one or more first zones of interest and performing the signal localization protocol; optionally, transporting one or more of the motile, mobile or portable wireless receiver antenna platforms to one or more additional zones of interest and repeating performance of the signal localization protocol at each of the one or more additional zones of interest, which process may be repeated any number of subsequent times, wherein the signal localization protocol including: placing each of the motile, mobile or portable wireless receiver antenna platforms at two or more points of interest, including a first, second and subsequent points of interest, within the first zones of interest and within any of the additional zones of interest, and at each point of the interest, executing signal acquisition and localization, including: detecting and acquiring, by the wireless receiver system, a set of one or more signals emitted by the one or more unknown wireless signal transmitters; measuring and tracking a position of the wireless receiver antenna platforms using one or more position sensors; emulating, by the wireless receiver system, a distributed virtual phased receiver antenna array that combines one or more measured positions of the one or more wireless receiver antenna platforms or wireless receiver antennas and temporal realignment of each of the one or more signals to compute a beampattern for the respective signal; computing, by the wireless receiver system, an asynchronous distributed receiver beamforming pattern along an azimuth and an elevation at the one or more motile, mobile or portable antenna platforms; calculating a direction of arrival (DoA), based on the asynchronous distributed receiver beamforming pattern, for each of the one or more signals emitted from each the one or more unknown wireless signal transmitters; and integrating one or more prior signal localization measurements from each of a set of one or more zones of interest, wherein the signal localization protocol has been previously performed at each zone of interest included in the set.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6A shows random distributed reception points, FIG. 6B shows beampattern with azimuth angle, and FIG. 6C shows 3D beampattern, according to embodiments of the disclosure.

FIG. 9A shows inaccuracies in temporal alignment of signals (yk), FIG. 9B shows RTK-GPS: position error in random trajectory, FIG. 9C shows RTK-GPS: Drift in accuracy over time, and FIG. 9D shows error in MUSIC & RFEye before clustering, according to embodiments of the disclosure.

FIG. 10A shows RF source with USRP B210 and 10 dBi antenna, FIG. 10B shows Intel Aero UAV with USRP B205 mini, and FIG. 10C shows RTK Base with RTK-GPS and GPS antenna on ground plate, according to embodiments of the disclosure.

FIG. 12A shows a number of reception points, FIG. 12B shows a radius of dominant clusters, and FIG. 12C shows a number of Fn instances, according to embodiments of the disclosure.

FIG. 13A shows an SNR of a received signal, FIG. 13B shows a bandwidth of a Tx signal, and FIG. 13C shows LOS and NLOS scenarios, according to embodiments of the disclosure.

FIG. 14B shows localization in X, Y and Z directions for Wi-Fi, according to embodiments of the disclosure. Additionally, FIG. 14C show DoA in azimuth, elevation for LoRa, and FIG. 14B shows localization in X, Y and Z directions for LoRa, according to embodiments of the disclosure.

FIG. 15A shows DoA accuracy at various UAV altitudes and FIG. 15B shows localization accuracy at various UAV altitudes, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure, it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referenced to elsewhere as a single part.

As discussed herein, the disclosure relates generally to signal detection, and more particularly, to a systems, methods, and program products for determining a location of one or more unknown wireless signal transmitters, independent of waveform.

These and other embodiments are discussed below with reference to FIGS. 1-15B. However, those skilled in the art will readily appreciate that the detailed description given herein with respect to these Figures is for explanatory purposes only and should not be construed as limiting.

INTRODUCTION

Figure 1:
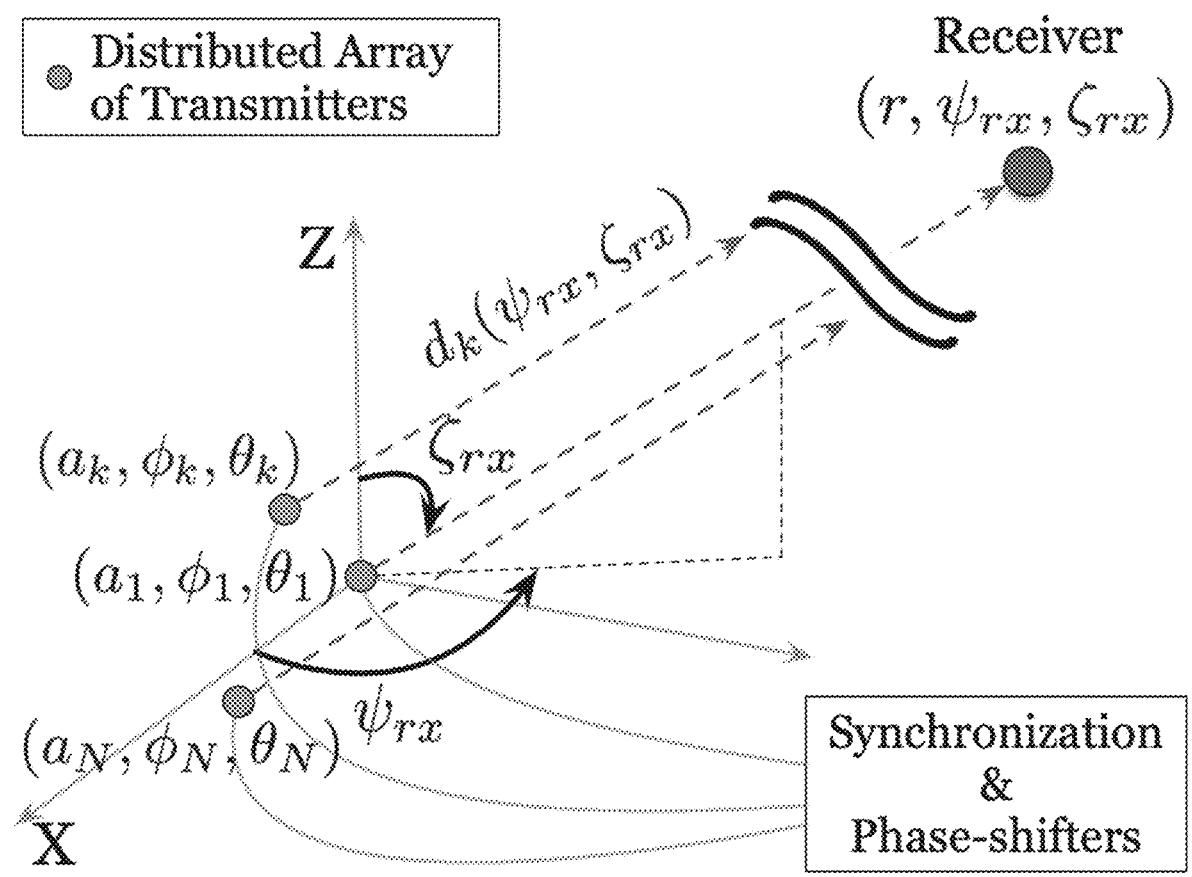
FIG. 1 shows a distributed transmitter beamforming, according to embodiments of the disclosure.

Embodiments herein recognize that distributed beamforming has been applied for transmitter beamforming by a cluster of distributed transmitters to a distant base station by emulating the properties of a synchronous antenna array. This requires precise timing and carrier frequency synchronization for collaborative transmissions. FIG. 1 shows the geometry of a receiver (in blue, larger dot) in far field and the synchronous transmitters (in red, smaller dots) that are randomly distributed in a three dimensional space. Since, the receiver is in far field, the electromagnetic waves emerge from the transmitter array in parallel, which is also the direction of arrival of the signal at the receiver. The position of the kth transmitter in spherical coordinates is given by (ak, φk, θk) and the first node located at (a1, φ1, θ1) is taken as the origin, without loss of generality. The location of the remote receiver is given by (r, ψ rx, ζrx) and the angles, rx ∈ [−π, π] and ζrx ∈ [−π, π] denote the azimuth and elevation of the receiver respectively. Assuming perfect synchrony among the transmitters to eliminate any frequency offset or phase jitter, the Euclidean distance between the kth transmitter at (ak, φk, θk) and any point at (r, ψ, ζ) is given by (1), $$d_k(\psi, \zeta) = [r^2 a_k^2 - 2 r a_k (\sin\psi \sin\phi_k \cos(\zeta - \theta_k) + \cos\psi \cos\phi_k)]^{\frac{1}{2}} \quad (1)$$
$$\approx r - a_k(\sin\psi \sin\phi_k \cos(\zeta - \theta_k) + \cos\psi \cos\phi_k)$$

where r>>ak in the far-field region.

Therefore, the phase of the incident signal at (r, ψ, ζ) due to the transmission from the kth transmitter is given by the complex exponential, $e^{j\ 2\pi/\lambda\ d_k(\psi,\zeta)}$. In order for the k transmitted waveforms to coherently add only at the far receiver, each signal is multiplied by the conjugate of the complex exponential (or weights), which provides the necessary phase rotation for directing the beam from the distributed array. Therefore, the beamforming weights of each transmitter, k∈ {1, 2, . . . , N} for a known receiver at (r, ψrx, ζrx) is set to wk(ψ rx, ζrx)=$e^{-j\ 2\pi/\lambda\ d_k(\psi\ rx,\zeta rx)}$, where λ is the wavelength of the carrier.

The corresponding array factor, given the transmitter locations a=[a1, a2, . . . , aN], φ=[φ1, φ2, . . . , φN] ∈ [−π, π]N, and θ=[θ1, θ2, . . . , θN] ∈ [−π, π]N is defined by (2), $$F(\psi, \zeta \mid a, \phi, \theta) = \frac{1}{N} \sum_{k=1}^{N} [w_k(\psi_{rx}, \zeta_{rx})] e^{j\frac{2\pi}{\lambda}d_k(\psi,\zeta)} \quad (2)$$
$$= \frac{1}{N} \sum_{k=1}^{N} e^{j\frac{2\pi}{\lambda}[d_k(\psi,\zeta) - d_k(\psi_{rx},\zeta_{rx})]}$$

The corresponding far-field beampattern is defined by (3), $$P(\psi, \zeta | a, \phi, \theta) \triangleq |F(\psi, \zeta | a, \phi, \theta)|^2 \quad (3)$$

Consequently, embodiments herein recognize that the beampattern is maximum when (ψ, ζ)=(Ψ rx, ζrx), i.e., along the true direction of the receiver. This is because the phase components of the weights and the impending signal at the receiver in (2), are exactly opposite in phase, and therefore add up constructively when (ψ, ζ)=(rx, ζrx), and add up destructively when (ψ, ζ) deviates from (ψ rx, ζrx).

Locating wireless signals in outdoor environment is necessary for various applications like locating rogue emitters for enforcing spectrum policies, pin-pointing targets in search and rescue operations and tracking the movement of agents in electronic warfare. Acquiring such signals is the first step, which often requires patrolling large distances over varied terrain and can be limited if terrestrial methods, like autonomous vehicles, crowdsourcing or fixed receiver arrays are used. Also, the signal acquired by terrestrial means can be severely attenuated or impaired due to Non-Line-of-Sight (NLOS), shadowing and other unknown factors. Signal acquisition using UAVs can overcome such limitations by flying to advantageous locations but are constrained on resources like power, RF front-end, antenna, processing and storage. RFEye is the first of its kind, that computes accurate location of a wireless emitter using only one UAV, equipped with only one antenna, acquiring no more than 20 packets in only two locations, separated by few meters without any precise maneuvering of the UAV.

Figure 2:
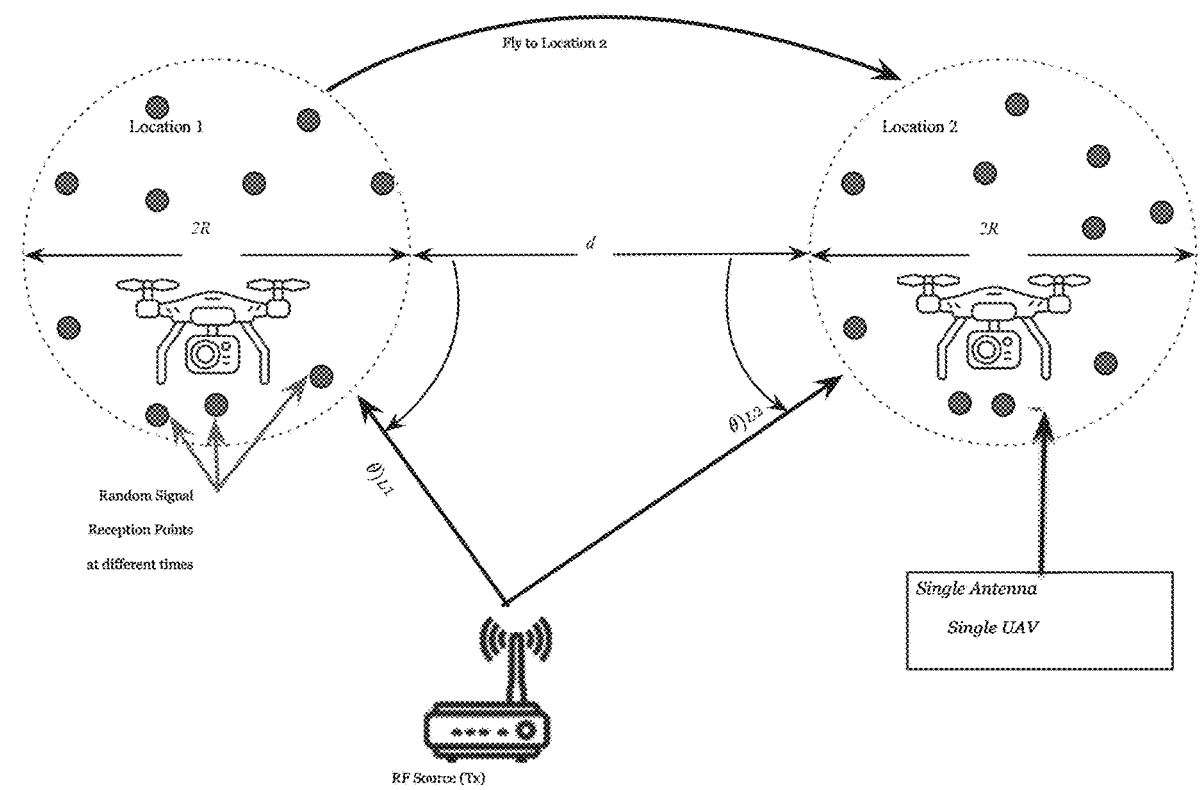
FIG. 2 shows One UAV equipped with only one antenna hovering at two locations to acquire signals from a remote emitter to localize the emitter, according to embodiments of the disclosure.

FIG. 2 shows the operation of RFEye. The UAV flies to an initial location of interest (Location 1) and hovers within a sphere of radius 1 meter, collecting signals using one omnidirectional antenna at various positions within the sphere. Then, the UAV moves to Location 2, a few meters away, and repeats the same procedure. These sets of signals acquired in each location are fused using a novel alignment technique while preserving the phase offsets between the signals acquired at different positions. The novelty of RFEye is in leveraging the normal movement of the UAV to acquire wireless signals without prior knowledge of the signal type or its transmit power and then align those in time to obtain the benefits of synchronous reception from spatially distributed antenna elements. All of this is achieved without the overhead of synchronous reception from multiple receiver front-ends. The temporal alignment is crucial to beamform using random acquisition points and to calculate the DoA (φ=Azimuth, θ=Elevation) from the emitter by searching the beamspace for the most likely direction of the signal. Further, by combining this information from two locations, as shown in FIG. 2, an accurate fix is obtained using trigonometric identities.

RFEye is designed to be highly portable to any UAV where reducing power consumption and payload is a priority. Instead of spending prohibitive amount of power to position the UAV on specific coordinates, RFEye embraces the normal movement of the UAV to acquire signals, including displacement due to wind, thus emulating a distributed antenna array. Wireless signals, especially waveforms used for communication purposes, often contain repetitive patterns (e.g., cyclostationary features embedded in preambles of physical layer packets) that are repeated periodically for error-free communication. Careful detection and alignment of such repetitive patterns embedded in these signals is used to extend the mathematical foundation of distributed synchronous arrays to design robust DoA algorithms in RFEye for uncoordinated and asynchronous arrays. Therefore, the contributions of this work are as follows:

1) Resource saving signal acquisition using single UAV—RFEye relies on a single UAV equipped with one antenna, with no precise control for positioning of the UAV. This greatly simplifies the payload and reduces the power requirement for the carrier. Furthermore, we design a computationally lightweight algorithm for on-board signal processing.

2) Waveform independent signal acquisition—By utilizing repetitive patterns embedded at the start of packet, RFEye implements a novel blind signature detection algorithm that removes any dependency on the emitter waveform.

3) Asynchronous distributed receiver beamforming—We emulate a distributed virtual phased array receiver that combines the measured positions of the UAV and time aligned features to compute the beampattern in each of the 360° along the azimuth and elevation. The direction that provides the maximum accumulated power in the beampattern, yields the DoA.

4) Error minimization using clustering—We explore the beamspace by combining a small subset of the captured signal each time, yielding a larger number of candidate DoAs. We use clustering to choose the median of the dominant cluster as the DoA. Furthermore, we analyze the sources of errors in RFEye and compare that with subspace-based DoA algorithm (2).

5) Hardware platform using COTS (Commercial off-the-shelf) devices—RFEye is a fully deployable platform, equipped with all the software components necessary to acquire signals in the field. The hardware architecture includes Intel Aero UAV, USRP B205-mini software-defined radio, Raspberry Pi and RTK-GPS modules. The research has been validated with extensive outdoor experiments using this platform.

2 Related Work

Precise localization of an emitter in indoor or outdoor settings has been studied for decades. In this section, we discuss the literature that is most relevant to this work. A broad comparison of RFEye to state-of-the-art RF localization technique is shown in Table 1. The key difference of RFEye is that, unlike other methods, it is able to localize any RF source (that transmits signals with repetitive patterns in it), by using a single receiver with only a single antenna, and achieves reasonable localization accuracy. Distinction between SAR and distributed beamforming: Syn-thetic Aperture Radars (SAR) use coherent detection of signals reflected from a target to emulate an antenna aperture to generate remote sensing imagery or locate the target. In contrast, RFEye has the advantage of localizing an unknown emitter itself using the signals captured at multiple locations using a single UAV. Localization based on SAR also leverage the movement of a device acting as a receiver to localize itself using signals captured from multiple transmitters. Whereas in RFEye, a single mobile receiver can locate a target emitter, which eliminates the need for multiple transmitters.

TABLE 1

Comparasion with state-of-the-art RF localization systems

| System | Metric | Method | Accuracy (Median) | Number of Receivers | Number of Antennas | Bandwidth | Generality |
|---|---|---|---|---|---|---|---|
| Array Track [3] | AOA | MUSIC | 0.23 m (2 D) (6 APs, 8 antenna) | 3 (min) | 4 (min) | 40 MHz | Limited to Wi-Fi |
| Tone Track [4] | TDOA | MUSIC | 0.90 m (4 APs, 3 antenna) | 3 (min) | 3 (min) | 3 of 20 MHz channels | Limited to Wi-Fi |
| SpotFi [5] | AOA, TOF | MUSIC | 0.4 m (2 D) (6 APs, 3 antenna) | 3 (min) | 3 | 40 MHz | Limited to Wi-Fi |
| Ubicarse [6] | AOA | SAR | 0.39 m (5 APs) | 3 (min) | 2 | 20/40 Mz | Limited to Wi-Fi |
| RFly [7] | AOA | SAR | 0.19 m (2 D) | 1 Reader, 1 Relay | 1 on Reader, 4 on Relay | | Limited to RFID |
| Chronos [8] | ToF | ToF Ranging | 0.65 m (2 D) | 1 | 3 | Multiple 20 MHz channels | Limited to Wi-Fi |
| SAIL [9] | ToF | ToF Ranging, Deadreckoning | 2.3 m (2 D) | 1 | 3 | 40 MHz | Limited to Wi-Fi |
| System in [10] | RSSI | Trilateration | 0.83 m (for distance ≤ 2.5 m) | 3 | 1 | Any Bandwidth | Known Tx power Any waveform |
| RFEye | AOA | Distributed Receiver Beamforming | Wi-Fi: 1.03 m (2D) 2.50 m (3 D) LoRa: 1.15m (2 D) 2.70 m (3 D) | 1 | 1 | Any Bandwidth | Any waveform with repetitive pattern |

Signal localization from UAVs: RFEye is one of many applications enabled by UAVs. TrackIO uses an outdoor UAV to localize mobile indoor nodes using Ultra Wideband (UWB) signals, trilateration and ranging protocols. Authors in SensorFly propose an indoor aerial sensor network of small UAVs that can self-locate using anchor nodes, which is an added infrastructure. The transmitter's location is derived by using UAV's GPS and Time of Flight (ToF) data using multilateration. Alternately, authors in use a UAV mounted 3D antenna array to maximize directivity, while in, a single portable helicopter based localization system is presented using the Received Signal Strength Indicator (RSSI) for localization, which fundamentally limits the accuracy of the derived location. Authors use directional antenna to find the direction of arrival of the source. However, directional antennas limit visibility of the radio environment often leading to blind spots and misdetection of unknown signals. Authors in use a network of UAVs to localize GPS jammers similar to military applications, where multiple UAVs, are used to scan in different channels to avoid jammers. Evidently, all of these methods require additional resources to be deployed for the system to work. Simultaneous localization of UAV and RF sources is proposed, that also include terrain information to improve accuracy. UAV wireless channel models are shown to be complicated and are extensively studied. However, we obviate any dependence on such deterministic or empirical models of the channel, by employing the geometry of distributed beamforming. Finally, RFly uses an RFID reader and RFID relay on a UAV to locate RFID tags by emulating an antenna array using SAR. In contrast RFEye localizes any source that emits a waveform with a repetitive pattern, which is widely known to be a common feature in communication signals.

Indoor signal localization: Almost all indoor localization techniques, including ArrayTrack, ToneTrack, PinPoint, Spotfi, primarily employ commonly known signal subspace-based methods (like Multiple Signal Classification (MUSIC)) either to derive Angle of Arrival (AoA) or Time Difference of Arrival (TDoA) and also require multiple antennas and wide bandwidths for accuracy. However, accuracy of DoA estimation using subspace methods are shown to severely degrade in the presence of array uncertainties such as errors in element position and synchronization. Chronos uses ToF data and relies on a MIMO access point (AP) to localize a transmitter associated with it. Ubicarse relies on the movement of a mobile, MIMO receiver (with at least two antennas) to emulate an antenna array and uses SAR techniques on the signals emitted from multiple transmitters to localize the receiver. This requires additional hardware (multiple antenna) for locating a single de-vice, which may not be available in outdoor environments and not suited for resource constrained devices. Moreover, it relies on the channel states measured by a Wi-Fi network card that cannot be used to localize other waveforms. In contrast, RFEye leverages only one antenna on a single receiver and uses receiver distributed beamforming on the repetitive patterns extracted from signals captured at various positions, to localize a remote RF transmitter. Outdoor signal localization: Literature on outdoor localization predominantly relies on GPS based self-positioning, which can help a source to locate itself within ≈3-5 m 2D location estimates. If that source wants to be located by other services, it can transmit its GPS location. This process makes the following assumptions regarding the source: a) the GPS receiver is available on the source incurring extra power consumption, b) the source is not in a GPS-denied environment, and c) the source transmits its GPS position. These assumptions do not hold in many outdoor applications including the localization of rogue emitters for spectrum policy enforcement or pinpointing targets in search and rescue operations and tracking the movement of agents in electronic warfare, primarily due to privacy and security concerns in revealing a source's GPS information. In contrast, RFEye is able to accurately locate any remote unknown source (even if located in GPS-denied environments) by capturing the signals that the source transmits from an UAV without any assumptions on the structure of signal being emitted and is robust to a variety of terrain and infrastructure.

High frequency and wideband techniques: Prior work have used other frequencies and wider bands to locate sources. For example, uses UWB to locate mobile tags using a single anchor along with a crude floor plan while provides 3D indoor location by exploiting the small wavelength and directional communication of mm-wave networks. Authors in introduce a multi-band backscatter technique to locate low power devices in non-line-of-sight scenarios and visible light is used in. However, many of these approaches are not feasible for localization of sources located at longer distances using a radio resource constrained receiver, which is why RFEye has been designed to operate in sub-6 GHz bands with only 5 to 20 MHz signal bandwidth.

Distributed Receiver Beamforming

Figure 3:
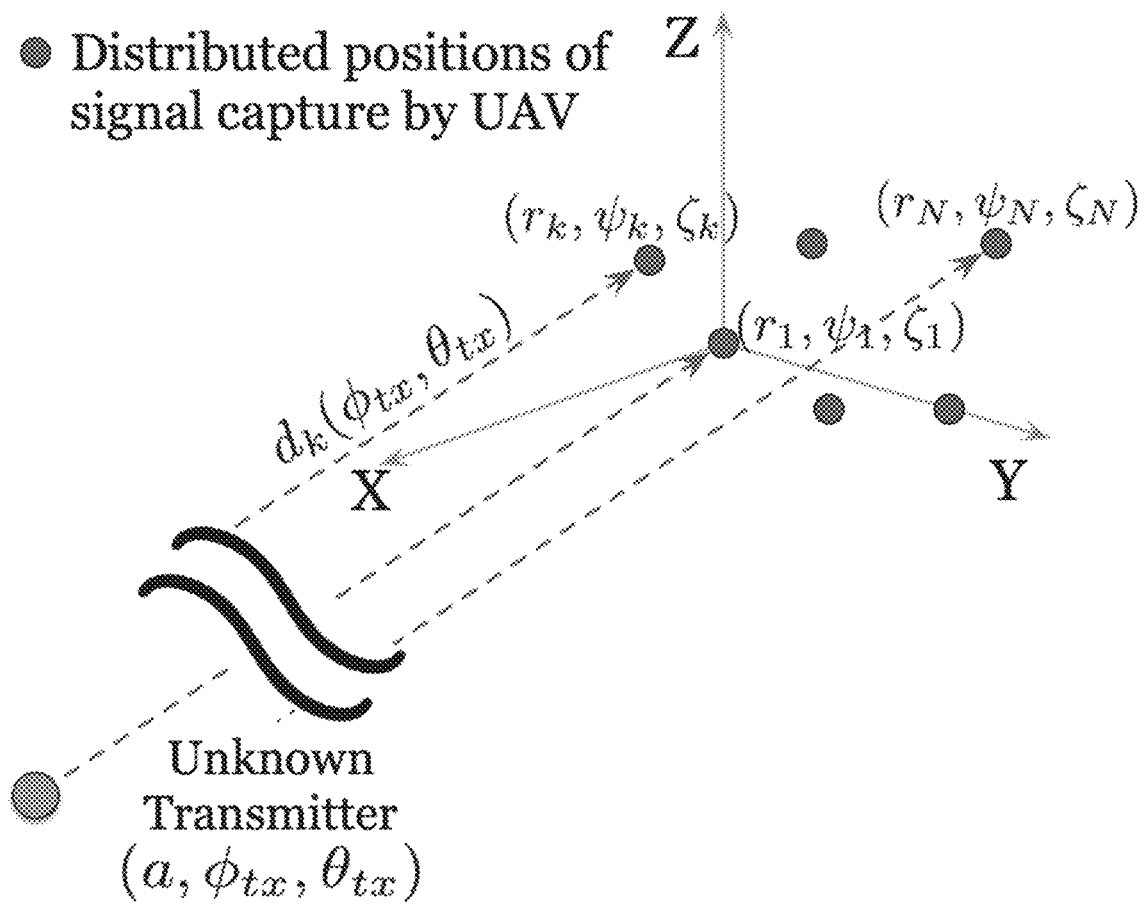
FIG. 3 shows a distributed receiver beamforming, according to embodiments of the disclosure.

RFEye uses a novel formulation of distributed receiver beamforming to perform DoA estimation that is distinct from transmitter beamforming (Section 3) in the following ways shown in FIG. 3.

Distributed transmitter beamforming forms a phased array when multiple nodes transmit synchronously to a known receiver. In contrast, RFEye creates a virtual phased array at the receiver by capturing signals from a remote, unknown transmitter at multiple distributed positions to estimate the DoA and its location.

Transmitter beamforming relies on the knowledge of two parameters: a) The exact location of the far-field receiver (r, $\psi rx$, $\zeta rx$) and b) Precise locations of the transmitter nodes (ak, $\varphi k$, $\theta k$) to determine the beamforming weights. In RFEye, these variables are unknown and require additional signal processing for receiver beamforming to be practical.

Transmitter beamforming requires precise timing and carrier frequency synchronization for collaborative transmissions. In RFEye the signals are captured asynchronously by a single receiver and aligned in time to create a synchronous, virtual array.

To overcome these challenges, we formulate a beamforming algorithm with asynchronous reception from an unknown transmitter using measurable but imprecise positions of spatially distributed array elements. FIG. 3 shows a far-field transmitter and randomly distributed reception points and without loss of generality, we consider the first position of the UAV as the local origin for DoA estimation. Keeping the notation in accordance to Section 3, the coordinates of the UAV is denoted by posk=(rk, $\psi k$, $\zeta k$) where 0≤rk<R, −π≤$\psi k$, $\zeta k$<π, and R is the radius of the sphere within which the UAV hovers at each location as shown in FIG. 1. posk is measured using an on-board high precision GPS described in Section 8. Similarly, the transmitter is located at (a, $\varphi tx$, $\theta tx$), where a is the Euclidean distance between the transmitter and the assumed local origin. Therefore, the Euclidean distance between posk and any node at (a, $\varphi$, $\theta$) is given by (4), dk($\varphi$, $\theta$)≈a−rk (sin $\varphi$ sin $\psi k$ cos ($\theta$−$\zeta k$)+cos $\varphi$ cos $\psi k$)≈a−d'k($\varphi$, $\theta$) (4) where, d'k($\varphi$, $\theta$) is variable and depends on posk, and the angles ($\varphi$, $\theta$). In order to determine the receiver beamforming weights, d'k($\varphi$, $\theta$) is used, since a is unknown and also because it does not impact the DoA and the eventual fix of the transmitter. We discuss this in Section 5.3.

The phase of the received signal: There are two factors that affect the phase of the signal received at each posk: a) The phase-shift due to different propagation distances, dk($\varphi tx$, $\theta tx$) given by the complex exponential, $e^{j\,2\pi/\lambda\,dk(\varphi tx,\theta tx)}$, and b) Common phase noise induced by carrier frequency offset, frequency selective fading and other native receiver non-linearities. Since the UAV captures distinct packets at different positions, it is necessary to preserve only the phase changes due to propagation delays between the positions (FIG. 3). This is achieved by identifying and extracting a unique signature embedded in the signal to align the signals captured at different reception points as explained in Sections 5.1 and 5.2. The time aligned signals collectively form a synchronous, virtual array where the phase of the signal at posk is given by $2\pi$ dk($\varphi tx$, $\theta tx$).

Therefore, the array factor, given the reception points r=[r1, r2, . . . , rN] ∈ [0, R]N, $\psi$=[$\psi$1, $\psi$2, . . . , $\psi$N] ∈ [−π, π]N, and $\zeta$=[$\zeta$1, $\zeta$2, . . . , $\zeta$N] ∈ [−π, π]N, is given by (5), $$F(\phi, \theta | r, \psi, \zeta) = \frac{1}{N}\sum_{k=1}^{N}[w_k(\phi, \theta)]e^{j\frac{2\pi}{\lambda}d_k(\phi_{tx},\theta_{tx})} \quad (5)$$

The corresponding beampattern is given by (6), $$P(\phi, \theta | r, \psi, \zeta) \triangleq |F(\phi, \theta | r, \psi, \zeta)|^2 \quad (6)$$

Furthermore, the complex weights $$w_k(\phi, \theta) = e^{j\frac{2\pi}{\lambda}d'_k(\phi,\theta)},$$

when multiplied with the received signal, rotates the phases of the received signals to constructively and coherently overlap in space, maximizing the beampattern in (6) in the direction of the remote transmitter ($\varphi tx$, $\theta tx$), which is also the DoA of the signal. The complex weights are explained in Section 5.3. Accordingly, there is set forth herein a method comprising: receiving by a movable (e.g., motile, mobile and/or portable) receiver moving within a first location (e.g., as described in connection with FIG. 2) a plurality of signal instances of a signal emitted by a transmitter (e.g., as described in connection with FIG. 2), wherein signal instances defining the plurality of signal instances are collected by the moveable receiver at different respective receiver positions within the first location (e.g., as described in connection with FIGS. 2 and 3); and discovering, for the first location (e.g., as described in connection with using (2), (3), (5), (6), (11), (12), (16), (17)), a direction of arrival parameter value that specifies a direction of arrival of the signal emitted by the transmitter, wherein the discovering includes using a set of signal instances from the plurality of signal instances. In another aspect, the method can include repeating the receiving and the discovering at a second location (e.g., as described in connection with FIG. 2, and Algorithm 1), and determining a location of the transmitter using the direction of arrival parameter value discovered for the first location and the direction of arrival parameter value discovered for the second location (e.g., as described in connection with FIG. 2, and Algorithm 1, and Section 5.4). In another aspect, the signal instances defining the plurality of signal instances can be asynchronously collected by the moveable receiver at different respective receiver positions within the first location (e.g., as described in connection with FIG. 3-5). In another aspect, the discovering can include finding a beam direction yielding maximum received energy (e.g., as described in connection with (2), (3), (5), (6), (11), (12), (16), (17) and FIG. 6B). There is also set forth herein, the method wherein the discovering includes aligning in time signal instances defining the set of signal instances (e.g., as described in connection with Sections 5.1 and 5.2). There is also set forth herein, the method wherein the discovering includes aligning in time signal instances defining the set of signal instances, and wherein the discovering includes finding a beam direction yielding maximum received energy (e.g., as described in connection with (2), (3), (5), (6), (11), (12), (16), (17) Sections 5.1 and 5.2)).

System Design

Localization using RFEye has four distinct stages: a) Blind Signature Detection: The UAV flies to an area of interest and captures the first signal to find a repetitive signature. b) Signal Acquisition and Conditioning: UAV hovers to collect signal traces from multiple positions while recording its own coordinates. c) Estimation of DoA: These signals are used to determine the DoA using the method described in Section 4 along with a fusion algorithm to maximize its accuracy and finally, d) Transmitter Localization: The DoA from two nearby locations are used to calculate the coordinates of the unknown transmitter.

5.1 Blind Signature Detection

Random access based packet transmission is common in many modern wireless protocols, like 802.11, LoRa and Sig-fox. These protocols use repetitive pattern in the preamble of the packet, which can be detected and extracted by blind detection methods. This makes RFEye applicable to a wide variety of waveforms unlike prior art, which require specific signal structures. Also, RFEye works without a repetitive pattern as long as the signature (preamble) is known to the receiver. In such cases, the blind signature detection is not required.

Figure 4:
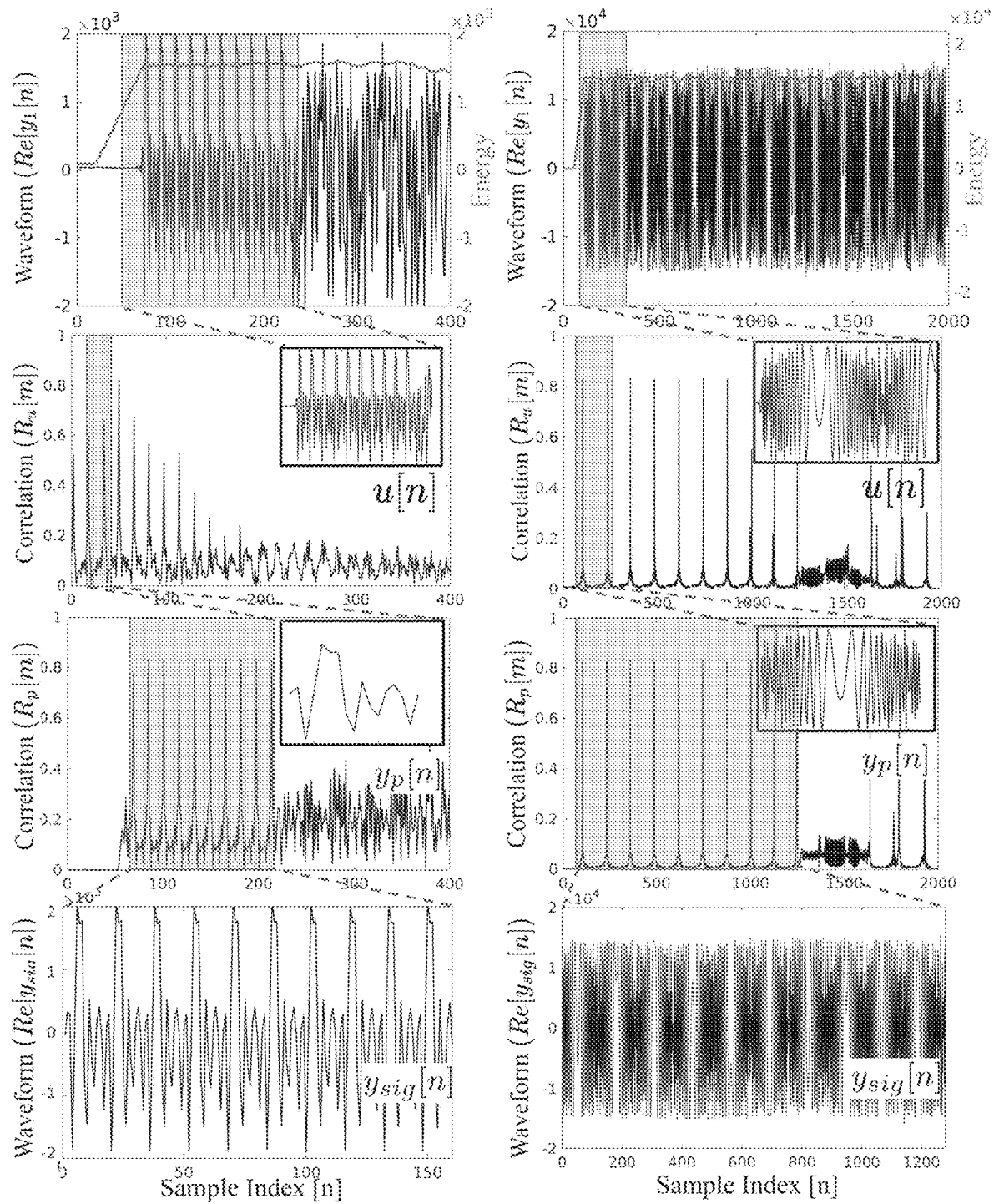
FIG. 4 shows detection and extraction of embedded signature ysig[n] for Wi-Fi (left) and LoRa (right), according to embodiments of the disclosure.

Let the signal captured at the first position be y1[n]. The goal is to extract a signature, ysig[n] (e.g., short preamble in 802.11 or chirp preamble in LoRa) embedded within y1[n] that appears in signals captured at all the positions. In random access packets, the signature is constructed by repeating a pattern, yp[n] (e.g., one symbol of short preamble in Wi-Fi or a single up-chirp in LoRa). We present a blind detection scheme, which first extracts the pattern from the signal received at the first position, pos1 of the UAV and then use it to extract the signature. This is shown in FIG. 4 and works in three steps:

Step 1: The energy envelope of the signal y1[n] is calculated and the first L samples of the envelope above a threshold are extracted, denoted by u[n] in (7), $$u[n] = y_1[\hat{n} - L : \hat{n}] \text{ where, } \hat{n} = \min\left\{ n : \left( \frac{1}{L}\sum_{i=0}^{L-1} |y_1[n-i]|^2 \right) \geq \eta_1 \right\} \quad (7)$$

where, $\hat{n}$ is the smallest index at which the energy envelope exceeds a decision threshold, $\eta 1$ (depends on the lowest target SNR of RFEye). The value of L (200 in this work) is selected so that u[n] contains at least one instance of yp[n] in an arbitrary waveform.

Step 2: u[n] is cross-correlated with the signal y1[n] to determine the exact indexes of yp[n]=y1[m1:m2] using (8), $$R_u[m] = \frac{\sum_{i=0}^{L-1} y_1[m+i]u^*[i]}{\sum_{i=0}^{L-1} |u[i]|^2} \quad (8a)$$

$$m_1 = \min(\{(m : R_u[m] \geq \eta_2\}) \quad (8b)$$

$$m_2 = \min(\{m : m \neq m_1, R_u[m] \geq \eta_2\}) \quad (8c)$$

Where, m1 and m2 denote the two consecutive lowest sample indices at which the normalized cross-correlation Ru[m] exceeds a threshold $\eta 2$ (set to 0.5 in this work to minimize false positives). The normalized cross-correlation is used for $\eta 2$ to be independent of the power level of y1[n]. The correlation also reveals the width of yp as Wp=m−m1. The cross-correlation for Wi-Fi and LoRa is shown in FIG. 4 along with the periodic pattern yp[n].

Step 3: The pattern yp[n] is then cross-correlated with the signal y1[n], to extract the signature ysig[n]=y1[m3:m4+Wp] using (9), $$R_p[m] = \frac{\sum_{i=0}^{L-1} y_1[m+i]y_p^*[i]}{\sum_{i=0}^{L-1} |y_p[i]|^2} \quad (9a)$$

$$m_3 = \min(\{m : R_p[m] \geq \eta_2\}) \quad (9b)$$

$$m_4 = \max(\{m : R_p[m] \geq \eta_2\}) \quad (9c)$$

where, m3 and m4 denote the lowest and highest sample indices at which the cross-correlation Rp[m] exceeds the threshold $\eta 2$. This also reveals the width of the signature, Wsig=m4+Wp−m3 and number of repetitions of yp. In FIG. 4, the cross-correlation of the signal with yp[n] reveals the complete signature, which contains 10 repetitive patterns for Wi-Fi and LoRa. This signature, ysig[n] is used to align the asynchronously received signals in time to apply receiver beamforming to compute the DoA.

5.2 Signal Acquisition and Conditioning

Figure 5:
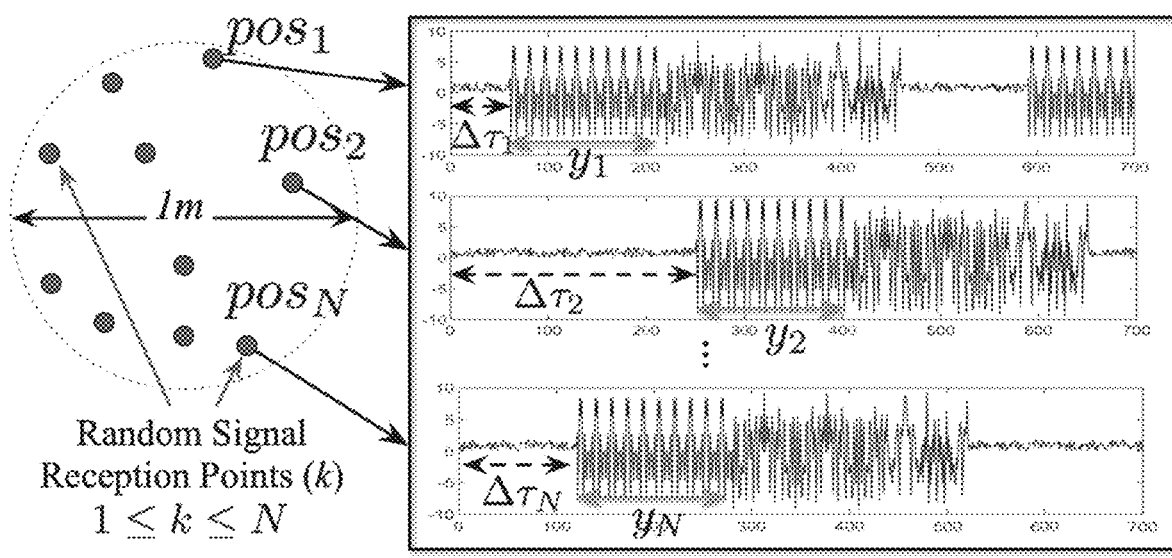
FIG. 5 shows a temporal alignment of yk[n], according to embodiments of the disclosure.

Signal and position capture: Signal acquisition is performed by the UAV in several positions within a radius of 1 m around a location, which are recorded using a high accuracy RTK-GPS positioning system. The signal captured at each position is denoted by yk[n] and the instantaneous position is denoted by posk. By not associating to a uniform linear array, RFEye removes the requirement for precise control and movement of the UAV, especially in presence of external factors like wind. The output of this process is a set of captured signals along with high-precision GPS locations associated with it for further signal processing. Temporal alignment: The UAV captures a continuous stream of the signal transmitted from the remote source at various positions. In each position the signal may contain a packet along with the preamble, but the start of the packet is unknown. To utilize the distributed beamforming technique from Section 4, synchronous reception of the same transmitted signal from multiple positions is required. Since we do not use multiple receivers, we emulate this by finding the exact indices of ysig[n] within the signals captured from each position and aligning those in time, to generate signals as captured by synchronous receivers. FIG. 5 shows the timing alignment by cross-correlating the captured signal, yk[n] with the signature, ysig[n] detected in Section 5.1. For each position the value of τk for which the cross-correlation in (10) is maximum, is a signal time lag.

Now, each signal instance captured at each position can be aligned in time domain by shifting the signal instance in time domain by −τk. This is the same as extracting candidate signals, yk=yk[τk:τk+Wsig] that emulate synchronously received signals necessary for receiver beamforming. Since asynchrony corrupts the ToF information of the signal, any approach that relies on ToF information for DoA estimation cannot be employed in this scenario.

Carrier frequency offset: Since, the same receiver (UAV) is used to capture all the signals, the carrier frequency synchronization is inherently ensured across all signal instances. This obviates the removal of any carrier frequency offset (CFO) between multiple signals, which is critical in multi-receiver distributed beamforming. However, CFO may exist between the transmitter and receiver which is estimated and removed using standard techniques at the first reception point. All captured signals are corrected accordingly by the same offset.

5.3 DoA Calculation

As explained in Section 4, in distributed receiver beamforming the signal instance at each position is multiplied with an unique complex exponential, wk(φ, θ). These weights are a function of the intended direction of the beam (φ, θ) and the relative position of the reception point (rk, ψk, ζk). Since, the phase of the time aligned signal, yk is given by $e^{j\ 2\pi/\lambda dk(\varphi tx, \theta tx)}$ the weights are chosen to be wk(φ, θ)=$e^{j\ 2\pi/\lambda\ d'k(\varphi,\theta)}$. Multiplying yk with the complex weight adjusts the phase in a way that the overall beampattern formed by the emulated distributed array is steered in the direction (φ, θ). Now, if this beam is swept in all possible values of (φ, θ) where −π≤φ, θ<π, the received energy is maximum in the direction of the unknown transmitter (φtx, θtx). The array factor is calculated using (5), $$R_p[m] = \frac{\sum_{i=0}^{L-1} y1[m+i]y_p^*[i]}{\sum_{i=0}^{L-1} |y_p[i]|^2} \quad (9a)$$

$$m_3 = \min(\{m:R_p[m] \geq \eta 2\}) \quad (9b)$$

$$m_4 = \max(\{m:R_p[m] \geq \eta 2\}) \quad (9c)$$

The term $e^{j(2\pi/\lambda)a}$ is a constant residual phase in the received signal that does not contribute to the magnitude of the array factor and the corresponding beampattern in (6). Hence, it has no bearing on the DoA estimation and can be safely ignored. The signals received at the UAV position, (r, ψ, ζ) are used to create a far-field beampattern P (φ, θ|r, ψ, ζ) and the angles corresponding to its maximum value is the DoA estimate (φ^tx, θ^tx) given by (12), $$(\hat{\phi}_{tx}, \hat{\theta}_{tx}) = \underset{\phi,\theta}{\mathrm{argmax}}\, P(\phi, \theta \mid r, \psi, \zeta) \quad (12)$$

Figures 6A, 6B, 6C:
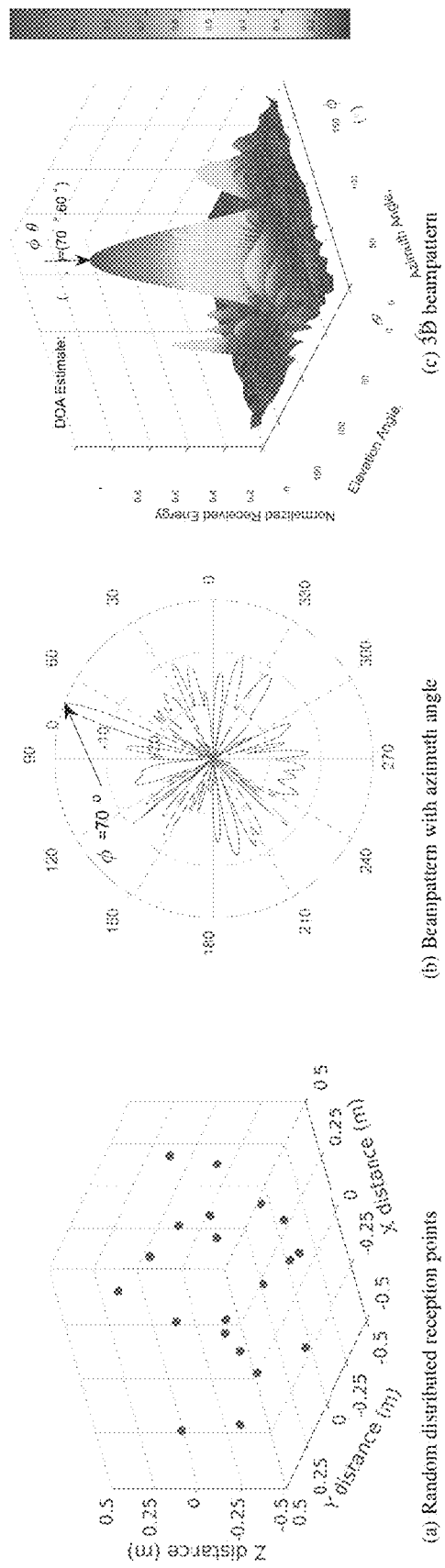
FIGS. 6A-6C show various data relating to beampatterns for asynchronous distributed receiver array. More specifically.

FIG. 6a shows an example realization of RFEye with 20 random positions. FIGS. 6b and 6c show the beampattern formed by yk and posk, where k∈{1:N} for a source transmitting from direction (φtx, θtx)=(70°, 60°). The beampattern is maximum when the sweep angle matches true direction of arrival of the signal, when there exists a direct path of the signal between the source and the UAV. Accordingly, there is set forth herein a method comprising: receiving by a movable receiver moving within a first location (e.g., as described in connection with FIG. 1) a plurality of signal instances of a signal emitted by a transmitter (e.g., as described in connection with FIG. 2 and FIG. 3), wherein signal instances defining the plurality of signal instances are collected by the moveable receiver at different respective receiver positions within the first location (e.g., as described in connection with FIGS. 2 and 3); and discovering, for the first location (e.g., as described in connection with using (2), (3), (5), (6), (11), (12), (16), (17)), a direction of arrival parameter value that specifies a direction of arrival of the signal emitted by the transmitter, wherein the discovering includes using a set of signal instances from the plurality of signal instances (e.g., as described in connection with (2), (3), (5), (6), (11), (12), (16), (17) and FIG. 6B). In another aspect, the method can include repeating the receiving and the discovering at a second location (e.g., as described in connection with FIG. 2, and Algorithm 1), and determining a location of the transmitter using the direction of arrival parameter value discovered for the first location and the direction of arrival parameter value discovered for the second location (e.g., as described in connection with FIG. 2, and Algorithm 1). In another aspect, the signal instances defining the plurality of signal instances can be asynchronously collected by the moveable receiver at different respective receiver positions within the first location (e.g., as described in connection with FIG. 3-5). There is also set forth herein, the method wherein the discovering includes finding a beam direction yielding maximum received energy (e.g., as described in connection with (2), (3), (5), (6), (11), (12), (16), (17) and FIG. 6B). There is also set forth herein, the method wherein the discovering includes aligning in time signal instances defining the set of signal instances (e.g., as described in connection with Sections 5.1 and 5.2). There is also set forth herein, the method wherein the discovering includes aligning in time signal instances defining the set of signal instances, and wherein the discovering includes finding a beam direction yielding maximum received energy (e.g., as described in connection with sections 5.1 and 5.2 and (2), (3), (5), (6), (11), (12). There is also set forth herein, the method wherein the discovering includes evaluating a returned energy from multiple beam directions and selecting in dependence on the evaluating yielding maximum received energy, wherein the evaluating the returned energy from multiple beam directions includes ascertaining a contribution from respective receiver positions associated to the set of signal instances (e.g., as described in connection with (2), (3), (5), (6), (11), (12). There is also set forth herein, the method wherein the discovering includes evaluating a returned energy from multiple beam directions and selecting in dependence on the evaluating yielding maximum received energy, wherein the evaluating the returned energy from multiple beam directions includes ascertaining a contribution from respective receiver positions associated to the set of signal instances, the ascertaining including applying beamforming weights for the respective receiver positions, the beamforming weights being determined using position parameter values specifying the respective receiver positions (e.g., discussion of beamforming weights, as described in connection with, e.g., (2), (3), (4), (5), (6), (11), (12) and section 5.3).

---

Algorithm 1: RFEye: Direction of Arrival

---

Data: N, $N_{max}$, $R_{th}$, set of signals and positions
  {$y_k$, $pos_k$}$^j$, for location j ∀ {1, 2} where k∀ {1..N}
Result: ($\hat{\phi}_{tx,j}$, $\hat{\theta}_{tx,j}$) = Direction of arrival at location j
for each location j ∈ {1..2} do
| D = [ ]
| for M = (N − 2) :−1: [N/2] do
| | tmp = ∞ , exit = 0
| | for n = 1: $N_{max}$ do
| | | Extract $F_n$ = {$y_k$, $pos_k$}, a subset with M
| | |   elements from {$y_k$, $pos_k$}$^j$
| | | for each ($\phi$, $\theta$)∈ {−TT..TT} do
| | | | Calculate P($\phi$, $\theta$) corresponding to $F_n$ using
| | | |   6)
| | | | if −3dB ≤ P($\phi$, $\theta$) ≤ 0dB then
| | | |     Append ($\phi$, $\theta$) to D
| | | | end
| | | end
| | | [$\overline{\phi}_r$, $\overline{\theta}_r$, $R_r$]r = dominant_cluster =
| | |     k-means-clustering(D)
| | | if $R_r$ < tmp then
| | | |   tmp = $R_r$
| | | |   ($\hat{\phi}_{tx,j}$, $\hat{\theta}_{tx,j}$) = [$\overline{\phi}_r$, $\overline{\theta}_r$]$_r$ dominant_cluster
| | | end
| | | if tmp < $R_{th}$ then exit = 1, break
| | end
| | if exit = 1 then break
| end
end

5.3.1 Improving the DoA Accuracy

Figure 7B:
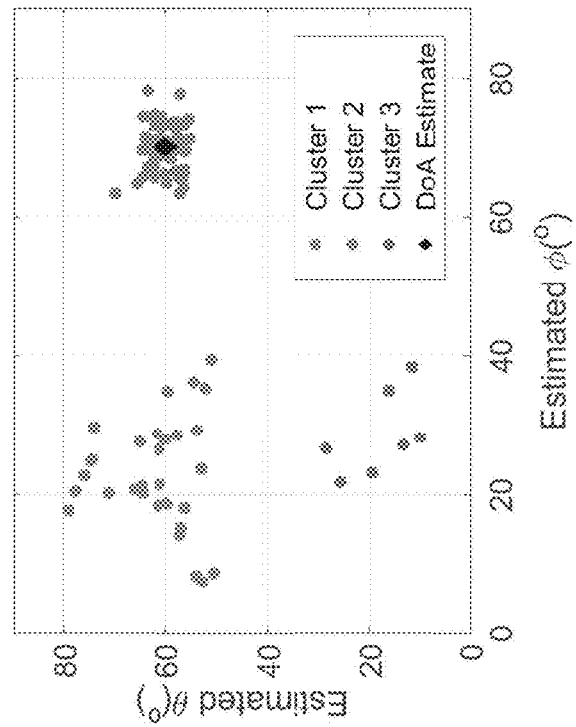
FIG. 7B shows clustering of DoA with a median of dominant cluster in the final DoA, according to embodiments of the disclosure.
Figure 7A:
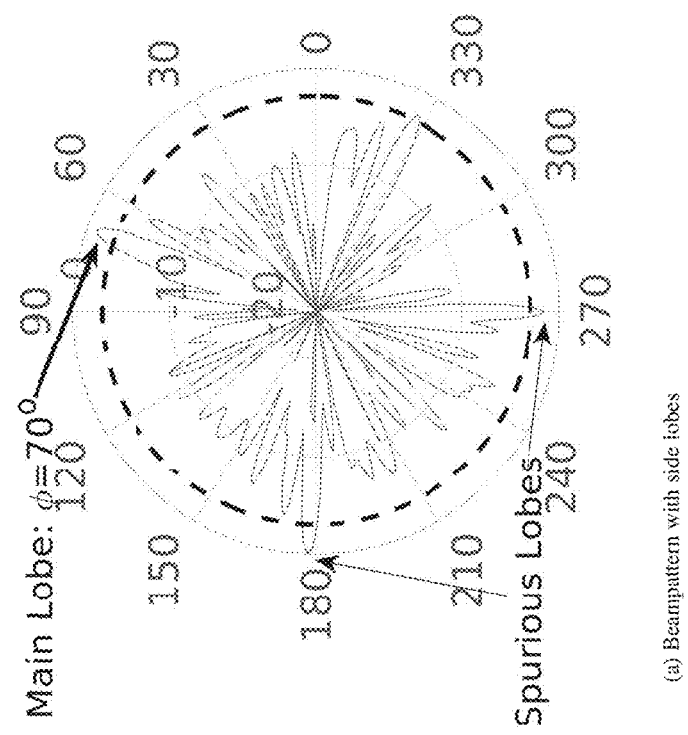
FIG. 7A shows beampattern with side lobes including lobes between 0 to −3 dB levels, according to embodiments of the disclosure.

It is common for the DoA estimate to be influenced by multi-path and shadowing effects leading to ambiguous location. The accuracy is improved by employing the following steps: a) Using different subsets of yk to produce multiple DoA estimates, b) Including all beams that are within 3 dB of the maximum beam obtained from (12) and c) Collectively, this creates a much larger search space for the DoA that can be iteratively inferred using a clustering algorithm.

a) Expand DoA estimates: Since, (12) incorporates the phase from all the signals yk, it is impossible to isolate the effect of errors introduced by one or more of these signals in the final DoA estimate. Instead, choosing M random yk's out of the available N signals the number of DoA estimates can be vastly increased which leads to more accurate location. This produces N=(N/M) unique subsets each containing M signals that yield N DoA using (12). The value of M is a trade-off between the accuracy of the individual DoA and the total number of DoA estimates while the value of N is a design choice depending on how fast the DoA estimate is required. Generally, under perfect time and phase synchronization of the signals and error-free positions of the UAV, the directivity the distributed array increases with M, leading to a more accurate DoA estimate. However, the value of N is maximum at M=[N/2], which limits the range of M to [N/2, N]. For each M, we define N unique subsets denoted by Fn={yk, posk} where, n∈{1:N}, k∈{1:N}, |Fn|=M and estimate the DoA for each set. However, to limit on-board computation the number of DoA calculations can be limited to specific number Nmax, which is determined empirically in Section 9.1.

b) Consider multiple beam directions: In the presence of multipath and shadowing effects in non-line-of-sight (NLOS) scenarios, the sidelobes can often lead to ambiguous DoA. For example, FIG. 7a shows spurious lobes other than the main lobe at ($\hat{\phi}$tx, $\hat{\theta}$tx)=(70°, 60°), which can also be inferred as the true direction. To alleviate this error, we choose all the beam directions that satisfy −3 dB≤P ($\phi$, $\theta$)≤0 dB (max), denoted by the set D={($\hat{\phi}$tx, $\hat{\theta}$itx)}, where i∈{1:number of side lobes satisfying the inequality}.

c) Clustering to improve DoA accuracy: From the above discussion, we find that the number of potential DoA can be significantly increased with limited number of signals (N). However, the DoA may vary for different Fn because of wireless propagation effects, hardware impairments, timing misalignment or error in UAV coordinates. Therefore, identifying clusters of ($\hat{\phi}$itx, $\hat{\theta}$itx) using K-means algorithm reveal regions of high affinity and choosing the median of the dominant cluster provides the most accurate DoA given the N measurements in a location. Algorithm 1 outlines the steps of clustering, represented by the objective function in (13), $$L = \sum_{r=1}^{K} L_r \text{ where, } L_r \sum_{i=1}^{|D|} a_r^j \left( \left\| \hat{\phi}_{tx}^i - \overline{\phi}_r \right\|^2 + \left\| \hat{\theta}_{tx}^i - \overline{\theta}_r \right\|^2 \right) \quad (13)$$

where, K is the number of clusters and is kept constant at 3 and ($\phi$r,$\theta$r) is the centroid of the rth cluster. Here, air=1 if ($\hat{\phi}$itx, $\hat{\theta}$itx) belongs to cluster r and 0 otherwise. This objective function is minimized in polynomial time using the algorithm in and the cluster with the smallest radius is considered as the dominant cluster. The centroid of this cluster is the most accurate estimate of the DoA as shown in FIG. 7b.

At each iteration of Algorithm 1, the radius of the dominant cluster determined by Rr=Lr/Nr. where Lr is from (13) and Nk is the number of points in the dominant cluster. As this radius gets iteratively smaller with the addition of new elements to the set D, it is compared with a threshold, Rth (determined empirically in Section 9.1) to avoid redundant iterations that may consume resources on the UAV. Finally, This algorithm is repeated for both locations to get the most accurate DoA possible from the available measurements and is reported in ($\hat{\phi}$tx,j, $\hat{\theta}$tx,j). Accordingly, there is set forth hereinabove in Section 5.3.1, a method comprising: receiving a plurality of signal instances of a signal emitted by a transmitter, wherein respective signal instances of the plurality of signal instances are collected at different positions; and discovering a plurality of direction of arrival parameter values that respectively specify a direction of arrival of the signal emitted by the transmitter, wherein the discovering includes using multiple sets of signal instances from the plurality of signal instances; examining the plurality of direction of arrival parameter values; and determining a direction of arrival of the signal emitted by the transmitter in dependence on the examining There is also set forth herein, the method wherein the examining includes subjecting the plurality of direction of arrival parameter values to clustering analysis, and wherein the determining the direction of arrival of the signal emitted by the transmitter includes performing the determining in dependence on the clustering analysis. There is also set forth herein, the method wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes subjecting the multiple direction of arrival parameter values to clustering analysis, and determining a direction of arrival of the signal emitted by the transmitter in dependence on the clustering analysis. There is also set forth herein, the method wherein the examining includes subjecting the plurality of direction of arrival parameter to clustering analysis and wherein the determining includes identifying a dominant cluster amongst multiple clusters, wherein respective clusters of the multiple clusters are defined by sets of direction of arrival parameter values from the plurality of direction of arrival parameter values. There is also set forth herein, the method wherein sets of the multiple sets of signal instances include randomly selected subsets of the plurality of signal instances. There is also set forth herein, the method wherein the discovering a plurality of direction of arrival parameter values that respectively specify a direction of arrival of the signal emitted by the transmitter includes ascertaining first and second direction of arrival parameter values using a single set of the multiple sets of signal instances, wherein the ascertaining includes selecting beam directions having power levels satisfying a power threshold. There is also set forth herein, the method wherein the receiving is performed by a moving receiver that moves over time to varying positions defining the different positions. Accordingly, there is set forth herein a method comprising: receiving by a movable receiver moving within a first location (e.g., as described in connection with FIG. 1) a plurality of signal instances of a signal emitted by a transmitter (e.g., as described in connection with FIG. 2 and FIG. 3), wherein signal instances defining the plurality of signal instances are collected by the moveable receiver at different respective receiver positions within the first location (e.g., as described in connection with FIGS. 2 and 3); and discovering, for the first location (e.g., as described in connection with using (2), (3), (5), (6), (11), (12), (16), (17)), a direction of arrival parameter value that specifies a direction of arrival of the signal emitted by the transmitter, wherein the discovering includes using a set of signal instances from the plurality of signal instances (e.g., as described in connection with (2), (3), (5), (6), (11), (12), (16), (17) and FIG. 6B). In another aspect, the method can include finding, for the first location, multiple direction of arrival parameter values, including the direction of arrival parameter value, specifying estimates of a direction of arrival of the signal emitted by the transmitter, wherein the finding includes repeating the discovering using multiple different sets of the signal instances selected from the plurality of signal instances, and wherein the method includes subjecting the multiple direction of arrival parameter values to clustering analysis, and determining a direction of arrival of the signal emitted by the transmitter in dependence on the clustering analysis. Given that embodiments herein perform time alignment of signals to emulate a virtual distributed antenna array having distributed antenna positions, embodiments herein recognize that clustering set forth in Section 5.3 is applicable for performance of direction of arrival determination wherein direction of arrival parameter values are determined with use of signal instances collected synchronously without time alignment using one or more receiver in communication with a distributed antenna array, e.g., which can include a plurality of antennas in distributed fixed relative position according to one embodiment. See, e.g., Section 3 herein.

5.4 Transmitter Localization Using DoA

Figure 8:
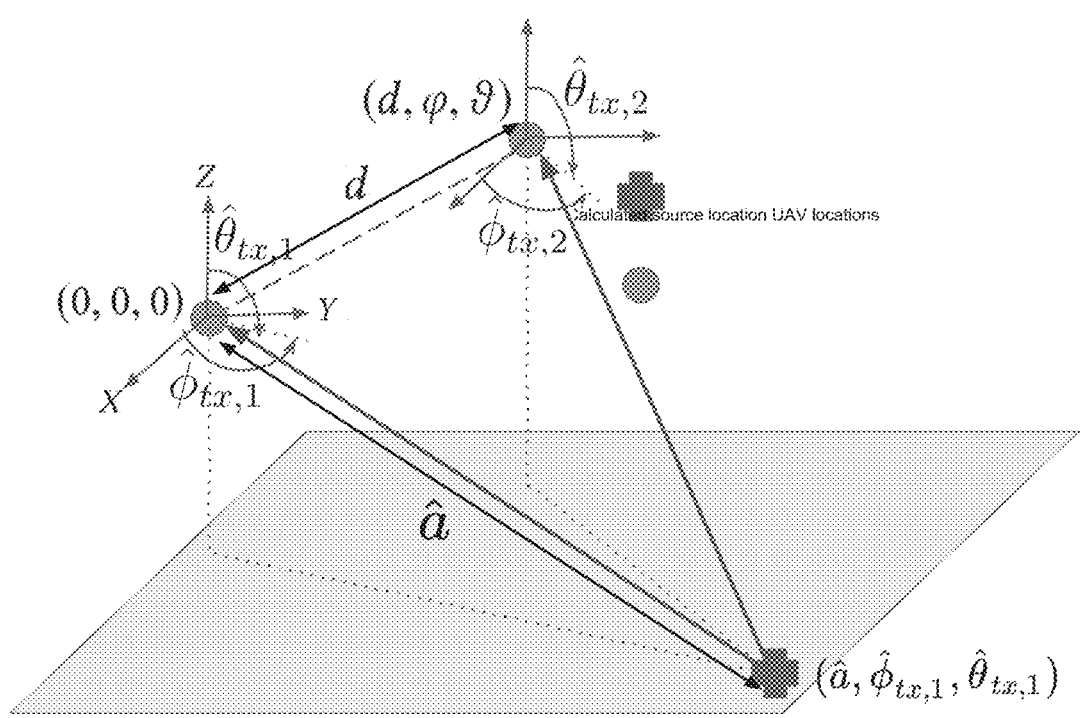
FIG. 8 shows a localization from the UAV, according to embodiments of the disclosure.

The unknown transmitter is localized with the DoA obtained from two locations as shown in FIG. 8. The UAV flies to a Location 1 and calculates the DoA ($\hat{\varphi}$tx,1, $\hat{\theta}$tx,1) as described in Section 5.3.1. Without loss of generality, this location is assumed as the origin with the axes aligned to the GPS axes. Then, it moves to Location 2 and calculates the DoA ($\hat{\varphi}$tx,2, $\hat{\theta}$tx,2).

Let the coordinates of Location 2 with respect to Location 1 (the assumed origin) be (d, $\phi$, $\vartheta$). Since the two locations are known from the RTK-GPS module (Section 8) the coordinates of transmitter is obtained at the intersection of the two lines at angles ($\hat{\varphi}$tx,1, $\hat{\theta}$tx,1) and ($\hat{\varphi}$tx,2, $\hat{\theta}$tx,2) as shown in FIG. 8. The spherical coordinates of the transmitter with respect to the origin, is given by ptx=($\hat{a}$, $\hat{\varphi}$tx,1, $\hat{\theta}$tx,1), where the range is given by (14), $$\hat{a} = \frac{d.\sin(v).\tan(\varphi - \hat{\phi}_{tx}, 2)}{(\tan(\hat{\phi}_{tx,1} - \varphi) + \tan(\varphi - \hat{\phi}_{tx,2}))\cos(\hat{\phi}_{tx,1} - \varphi)\sin(\hat{\theta}_{tx,1})} \quad (14)$$

Now, if the GPS coordinates of Location 1 is p1, then the GPS coordinates of the transmitter is given by p1+ptx. This does not require the transmit power of the source to remain constant unlike commonly required in RSSI based trilateration approaches. Accordingly, there is set forth herein a method comprising: receiving by a movable receiver moving within a first location (e.g., as described in connection with FIG. 2) a plurality of signal instances of a signal emitted by a transmitter (e.g., as described in connection with FIG. 2), wherein signal instances defining the plurality of signal instances are collected by the moveable receiver at different respective receiver positions within the first location (e.g., as described in connection with FIGS. 2 and 3); and discovering, for the first location (e.g., as described in connection with using FIG. 2), a direction of arrival parameter value that specifies a direction of arrival of the signal emitted by the transmitter, wherein the discovering includes using a set of signal instances from the plurality of signal instances (e.g., as described in connection with (2), (3), (5), (6), (11), (12), (16), (17) and FIG. 6B). There is also set forth herein, the method wherein the method includes finding, for the first location, multiple direction of arrival parameter values, including the direction of arrival parameter value, specifying a direction of arrival of the signal emitted by the transmitter, wherein the finding includes performing the discovering using multiple different sets of the signal instances selected from the plurality of signal instances (e.g., as described in connection with Section 5.3.1). There is also set forth herein the method, wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes employing clustering analysis to select best directions of arrival parameter values from the multiple direction of arrival parameter values (e.g., as described in connection with FIG. 7B). There is also set forth herein, the method wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes employing clustering analysis to select best direction of arrival parameter values from the multiple direction of arrival parameter values, wherein the method includes providing a first location direction of arrival parameter value using the clustering analysis based on the selected best direction of arrival parameter values, repeating the finding for a second location to provide a second location direction of arrival parameter value, and deriving a location of the transmitter using the first location direction of arrival parameter value and the second location direction of arrival parameter value (e.g., as described in connection with FIG. 7B, FIG. 2 and Algorithm 1). There is also set forth the method, wherein the discovering employs an angle of arrival method for performing the discovering (e.g., as described in connection with (2), (3), (5), (6), (11), (12), (16), (17)). There is also set forth the method, wherein the discovering employs an emulated distributed receiver beamforming method for performing the discovering (e.g., as described in connection with (2), (3), (5), (6), (11), (12), (16), (17)). There is also set forth the method, wherein the discovering employs a multiple signal classification (MUSIC) method for performing the discovering (e.g., as described in connection with (16)).

6 Error Analysis

Figure 9A:
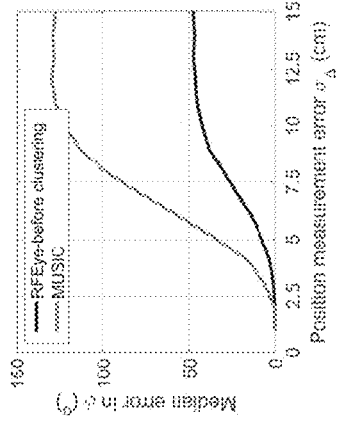
FIGS. 9A-9D show error analysis in RFEye. More specifically.
Figure 9B:
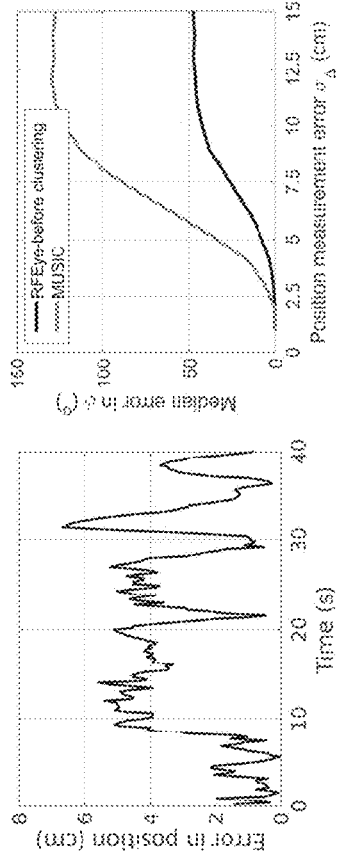
Figure 9C:
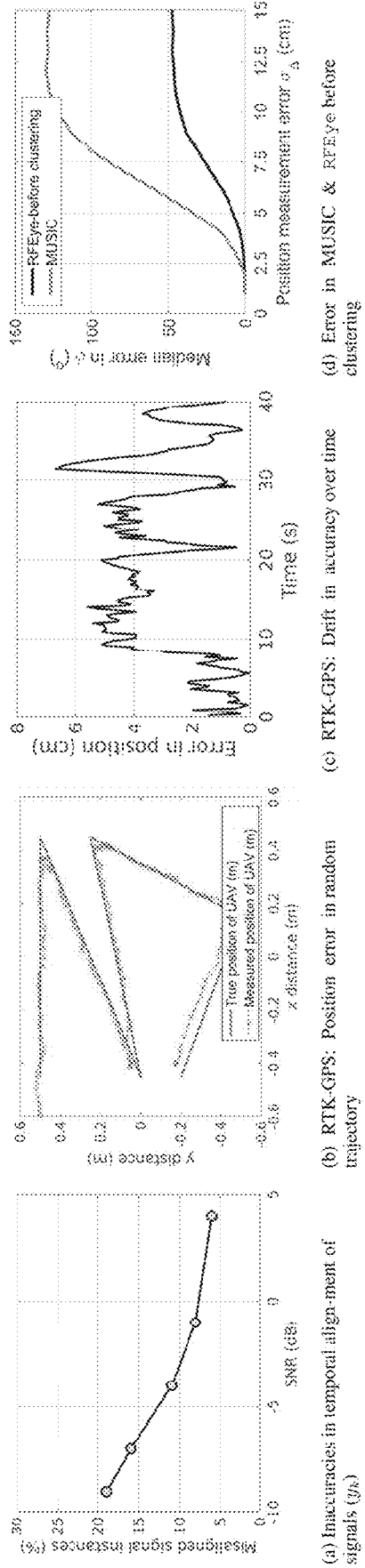

The accuracy of RFEye depends on two major sources of errors: a) Imperfect temporal alignment of signal instances yk and b) Position errors of the UAV. Apart from analyzing the impact of these sources of errors, we also compare the error performance between RFEye and signal subspace based methods.

a) Imperfect temporal alignment: Imperfect temporal alignment of signal instances manifests as a residual phase error and distorts the beampattern, leading to errors in the DoA. For example, in Wi-Fi signals, 1 sample misalignment corresponds to a time shift of 50 ns and 200 ns at sample rates of 20 MHz and 5 MHz respectively. Thus, the error due to imperfect time alignment is less when the sample rate is high. Since the alignment is based on cross-correlation, its accuracy also depends on the SNR of yk and therefore can cause unwanted correlation peaks using (10) at lower values. FIG. 9a shows the misalignment of signal instances with SNR for an outdoor pedestrian channel with Rayleigh multipath fading profile. It is evident that the effect of the channel is minimal for SNRs where the packets are actually decodable. Any residual error due to misalignment is eventually removed by the clustering in Algorithm 1.

b) Position errors of the UAV: The DoA also relies on correct positions of the UAV, measured using the RTK-GPS. Now, values of posk can be impaired due to error in RTK-GPS measurement itself, which typically has a cm-level accuracy and precision. FIG. 9b shows the measured positions of the UAV versus the true positions for a random trajectory where the error is greater than the documented accuracy of 2.5 cm. FIG. 9c shows the position error over time. Unlike inertial measurement unit (IMU) positioning systems the drift is not large enough to cause errors in the DoA. Furthermore, the RTK-GPS logs the position 5 times per second. Since the UAV is in continuous motion during hovering, the exact position may deviate from the last reported value. Since the last reported position is chosen for DoA calculation it can introduce unknown errors. However, RFEye successfully cancels these effects by clustering the potential DoA.

6.1 Error Comparison Between DoA Algorithms

There are two major classes of techniques employed for DoA estimation in RF systems: a) Signal decomposition and b) Array geometry. Algorithms using signal decomposition include the De-lay and Sum (DAS) method, Minimum Variance Distortion-less Response (MVDR) beamformer, Estimation of Signal Parameters via Rotation Invariance Techniques (ESPRIT), Multiple Signal Classification (MUSIC), Joint Angle and Delay Estimation (JADE), Space-Alternating Generalized Expectation-maximization (SAGE), etc. MUSIC has been widely used in state-of-the-art RF localization systems due to its ability to perform high resolution direction estimation at low SNR. However, it is extremely sensitive to receiver location, gain and phase errors and it requires careful calibration for accuracy. Additionally, the requirement to perform Eigen decomposition and to scan through all the angles is computationally expensive. This makes the state-of-the-art indoor localization approaches ineffective in resource-constrained agents. In contrast, RFEye is a light-weight, online and robust algorithm for DoA estimation. Distributed beamforming has been theoretically studied in the context of time-synchronized wireless sensors for uniform, gaussian or arbitrary spatial distributions. We analyze the impact of position error of the UAV on the DoA estimation accuracy based on our formulation of distributed receiver beamforming and compare it to subspace-based techniques like MUSIC.

6.1.1 RFEye Algorithm

Let posk is represented in rectangular coordinates (assuming coplanar points) by (xk, yk), k=1, . . . , N is jointly Gaussian with zero mean and variance σ2. Due to the error in the measured positions, the actual coordinates are (x'k, y'k), k=1, . . . , N, where x'k=xk+Δxk and y'k=yk+Δyk. Here (Δxk, Δyk) is also jointly Gaussian with zero mean and variance σ2Δ. Thus, the measured coordinates are jointly Gaussian with zero mean and variance $\sigma'^2 = \sigma^2 + \sigma^2\Delta$. In practice, $\sigma^2\Delta << \sigma^2$ because the UAV hovers over a larger radius (1 m), compared to the magnitude of the error term. Thus, the variance of posk is dominated by $\sigma^2$. The corresponding polar coordinates, (r'k, ψ'k), where $$r'k = \sqrt{x'_k2 + y'_k2}$$

is Rayleigh distributed and ψ'k=tan−1 (yk/xk) is uniform in [−π, π], $$f_{r'_k}(r') = \frac{r'}{\sigma'^2} e^{-\frac{r'^2}{2\sigma'^2}}, 0 \leq r' < \infty \text{ and } f_{\psi'_k}(\psi') = \frac{1}{2\pi}, -\pi \leq \psi' < \pi.$$

For analysis assume without loss of generality that (φtx, θtx)=(0, π/2) similar to other disclosures. The array factor and the average beampattern over all realizations of (r, ψ) is given by (15), $$P_{av}(\phi) = \frac{1}{N} + \left(1 - \frac{1}{N}\right)\left|e - \frac{\left(4\pi\sin\left(\frac{\phi}{2}\right)\right)^2 \sigma'^2}{2\lambda^2}\right|^2 \quad (15)$$

The main lobe of the average beampattern is represented by the second term in (15), which is a function of N, the steering angle φ and the distribution of the measured UAV coordinates. Even in the presence of position errors, the average beampattern is maximum when φ=0, i.e., when φ matches the actual DoA φtx, showing the robustness of RFEye in the presence of errors.

The main lobe in (15) decays exponentially with a rate proportional to the variance $\sigma^2$. Two important observations can be made from this: 1) A narrow distribution of posk, i.e., small $\sigma^2$ yields greater power in the main lobe of the beampattern and more accurate DoA and 2) Since the power of the main lobe is dominated by $\sigma^2$ distributed receiver beamforming is resilient to position errors. However, if posk are farther apart (higher $\sigma^2$), it will decrease the power in the main lobe but will have less error in the beampattern. Thus, the variance of posk is a design trade-off in RFEye.

6.1.2 Alternative Algorithms (e.g., MUSIC)

The method set forth in reference to (2), (3), (5), (6), (11), (12) provides for straightforward calculation of beam power by multiplying the signal instance collected at each receiver position by beamforming weights. Embodiments herein recognize that alternative algorithms can be employed for determination of a direction of arrival parameter value specifying a direction of arrival of an emitted signal emitted by a transmitter at an unknown location. Like the embodiment set forth with reference to (2), (3), (5), (6), (11), (12) these alternative embodiments can employ alignment of signals to emulate a virtual distributed antenna array.

According to one example, the MUSIC spectrum measures the distance between the steering vector, a(φ, θ) (the vector of complex weights to steer the beam in direction (φ, θ)) and the noise subspace En determined by Eigenanalysis of yk. to calculate the DoA using (16), $$P_{MUSIC}(\phi, \theta) = \frac{1}{a(\phi, \theta)^H E_n E_n^H a(\phi, \theta)} \quad (16)$$

where, $a(\phi, \theta) = [w_1(\phi, \theta, \ldots, w_N(\phi, \theta)]$

Figure 9D:
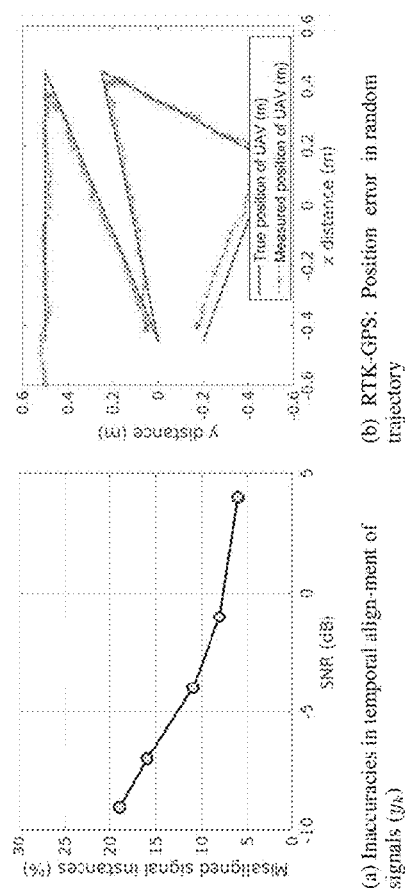

PMUSIC (φ, θ) generate peaks when the steering vector is exactly orthogonal to the noise subspace vector, which happens only when (φ, θ) coincides with the DoA of the incoming signal. Hence, the accuracy depends on the orthogonality of En and the steering vector a(φ, θ) which is sensitive to the values of posk that are prone to measurement fluctuations and errors as shown in FIGS. 9a-c. This leads to a bias in the DoA estimate from MUSIC proportional to the variance $\sigma^2\Delta$. FIG. 9d shows better accuracy of RFEye over MUSIC without clustering even at smaller values of error in posk. As set forth in (16), with signal instances collected (e.g., as described in connection with FIG. 2-3) and aligned (e.g., as set forth in Section 5.1-5.3), and beamforming weights calculated as a function of recorded position (e.g., discussion of beamforming weights, as described in connection with, e.g., (2), (3), (4), (5), (6), (11), (12), (16), (17) and section 5.3), beam energy can be determined at multiple beam directions to ascertain a beam direction yielding maximum energy using (16). Embodiments herein recognize that MUSIC can be regarded as a super resolution DoA estimation algorithm. With MUSIC, power spectrum or beampattern estimate (for each steering direction) can depend on the orthogonality of the noise subspace estimated from the signal and the steering vector for that direction. Hence, MUSIC can reliably isolate objects that are located in similar directions that are only a few degrees apart. Super resolution DoA estimation algorithms can achieve higher spatial or angle resolution compared to standard time or frequency domain techniques. While the error in the DoA estimates (bias) may become less accurate when the array positions are susceptible to measurement error, DoA determination performance with use of MUSIC can improve where array positions can be determined with greater accuracy, e.g., with improved measurement resources, or where localization is performed in respect to a distributed antenna array which can include a plurality of antennas in distributed fixed relative position.

Embodiments herein recognize that any AoA algorithm that does not rely on a uniform antenna array structure (e.g., uniform linear array, uniform circular array or uniform rectangular array) can be employed for determining a transmitter DoA parameter value after time alignment of signals instances to emulate a virtual antenna array (e.g., as set forth in Sections 5.1-5.3). In addition to the direct calculation method of (2), (3), (5), (6), (11), (12) and the MUSIC method, expressed in (16), other AoA algorithms that can be used to ascertain transmitter direction of arrival can include, e.g., Capon, Root-MUSIC, and ESPRIT.

For example, let the received signal after multiplying with the weights vector (or steering vector) be x=a(θ)y[n]+v[n], where v[n] is the Gaussian noise added at the receiver, y=[y1, ..., yk, ..., yN] is the vector of containing the signals received at all positions and a(φ, θ)= [w1(φ, θ), ..., wk, ..., wN (φ, θ)] is the vector of weights calculated for all position for an intended direction (φ, θ). Here each wk is calculated as wk(φ, θ)=$e^{j\, 2\pi/\lambda\, d'k(\phi,\theta)}$.

1) MUSIC (See (16) above), where the noise subspace En is estimated by Eigenanalysis of y or R^xx.

2) Capon Algorithm (Minimum Variance distortionless Response (MVDR))

$$P_{Capon}(\phi, \theta) = \frac{1}{a^H(\phi, \theta)\hat{R}_{xx}^{-1} a(\phi, \theta)} \quad (17)$$

where the correlation matrix R^xx is empirically estimated using R^xx=1 N xxH.

Similar to the DoA algorithm set forth in reference to (2), (3), (5), (6), (11), (12), the methods set forth in reference to (16) (MUSIC) and (17)(Capon) estimate the DoA as the direction (φ, θ) in which the resultant received power (energy) is maximum.

Root-MUSIC and ESPRIT methods of DoA determination can employ linear algebra and have common elements with MUSIC, and accordingly can be performed using the steering vector a(φ, θ) as set forth herein and the time aligned signals that are captured y (e.g., at Sections 5.1-5.3) as set forth herein.

Root-MUSIC and ESPRIT methods of DoA determination traditionally employ uniformly spaced array points. However, embodiments herein recognize that Root-MUSIC and ESPRIT methods of DoA determination can be adapted to non-uniform (or randomly distributed) arrays by modeling the non-uniform receive points using a uniform grid with missing points.

Therefore, the DoA estimate using Root-MUSIC and ESPRIT methods of DoA determination are not typically expressed using a single equation for the Power spectrum as in (2), (3), (5), (6), (11), (12), (16), (17) as set forth herein. For facilitating use of the Root-MUSIC method for DoA determination, embodiments herein recognize that the denominator of (16) (MUSIC) can be solved for by expressing it as a polynomial of a complex-valued variable. For facilitating, use of the ESPRIT method of DoA determination, the eigendecomposition of $R\hat{}xx$ results in two eigenspaces one corresponding to the signal, Es and the other corresponding to the noise, En. Embodiments herein recognize that ESPRIT uses Es and linear algebraic techniques to solve for $(\varphi, \theta)$.

Employing different ones of the described DoA estimation methods can be advantageous for different application, sensor resources deployed, and processing resources available.

In one aspect, an advantage of the direct calculation DoA estimation algorithm as set forth in reference to (2), (3), (5), (6), (11), (12) (i.e., signal and weight product-based distributed receiver beamforming) is that the method is relatively more robust to random position estimation errors of the UAV (as shown in FIG. 9d), whereas the other AoA techniques (e.g., sub-space based techniques like MUSIC, root MUSIC and ESPRIT), can be susceptible to random position estimation errors. This is due to the different formulae for the beampattern (or received power) being utilized. Whereas the DoA determination method of (2), (3), (5), (6), (11), (12) only depends on the interaction of the weights and the captured signal, MUSIC, Capson, Root-MUSIC and ESPRIT methods herein can rely on the interaction of these weights on the sub-space estimates from a captured signal and tend to be more sensitive to the position errors.

In one example, the beampattern in MUSIC shows a peak when the steering vector is exactly orthogonal to the noise subspace vector, which happens only when $(\varphi, \theta)$ coincides with the DoA of the incoming signal. Hence, the accuracy depends on the orthogonality of En and the steering vector $a(\varphi, \theta)$ which is sensitive to the position estimates of the UAV that are prone to measurement fluctuations and errors. Accordingly, while advantageous in some applications including where position is known or can be precisely measured, the MUSIC-based DoA estimate can be subject to a bias that is proportional to the variance of the error.

Embodiments herein can employ, e.g., 1. Asynchronous signal acquisition at different positions, and blind detection of a signature within the signal that can be used for DoA estimation, 2. Time alignment of signals to emulate a virtual distributed antenna array, 3. Calculation of DoA estimate using any AoA technique as set forth herein, 4. Clustering to improve DoA estimate, and 5. Localization using DoA estimates at first and second locations.

7 Computational Complexity of RFEye

The computational complexity of RFEye is determined by the four steps in Section 5. It is straight-forward to conclude that the blind detection in Section 5.1 runs in constant time due the fixed correlation window (L), and the temporal alignment in Section 5.2 has a linear time complexity of O(N). DoA calculation in Section 5.3 involves extracting Fn and clustering the potential DoA according to Algorithm 1. The second loop repeats for a maximum of (N−2)−N/2 times for each location j and the third loop iterates for a maximum of Nmax times for each M. Extracting Fn has a linear complexity of O(N). Let, G=360°×360° denote the search space for the azimuth $(\varphi)$ and elevation $(\theta)$. Computing the array factor and beampattern using (5) and (6) for each G and M reception points (|Fn|) has complexity O(MG) and determining the direction of maximum power using (12) with O(G). Therefore, RFEye computes the DoA in linear time of O((MG+G)≈O(MG). In contrast, MUSIC has a quadratic complexity in M, O(M2G+M2)≈O(M2G). Since DoA calculation in RFEye has a lower complexity than MUSIC it can execute in real-time on resource-constrained devices like UAV. The clustering uses a low complexity k-means algorithm that executes in O(KNmax)≈O(Nmax) time, where K=3. Therefore, the overall complexity of RFEye is given by (18), $$O(\{N - 2 - [N/2]\}N_{max}\{N + MG + N_{max}\}) \approx O(NN_{max}(N + MG + N_{max})) \quad (18)$$

Since Nmax is constant and M<N, the overall complexity is O(N(N+NG))≈O(N2G). For resource constrained devices, M can be fixed empirically (explained in Section 9.1) and in practice N<<G, which leads to a complexity of O(NG) from (18). Further, the complexity of scanning the search space G, can be improved by first scanning at a low resolution and iteratively scanning at higher resolutions only at angles at which the beam-pattern is maximum, yielding a logarithmic search complexity of O(log2G). Thus, the complexity of RFEye is O(Nlog2G).

8 Implementation & Experimental Setup

8.1 Transmitter and UAV Hardware

Figures 10A, 10B, 10C:
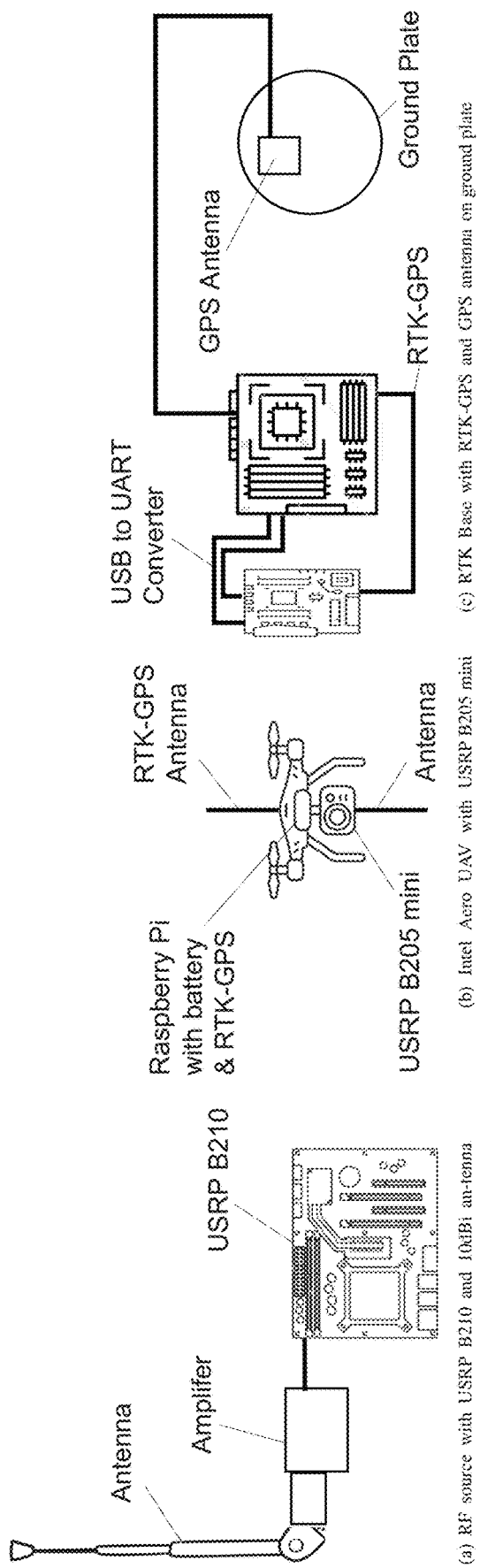
FIGS. 10A-10C show experimental hardware setups for the RFEeye. More specifically.

The transmitter consists of a USRP B210 with a 10 dB RF amplifier and 6 dBi antenna to transmit a signal with a repetitive pattern. For experimental purposes the Wi-Fi preamble was continuously transmitted which served as the embedded signature, ysig[n]. For over-the-air experiments an unused Wi-Fi channel was used. The amplifier boosts the B210 signal to 26 dBm which was sufficient to conduct outdoor experiments but much lower than commercial Wi-Fi access points and the FCC's recommendation of 4 W in 2.4 GHz unlicensed spectrum. FIG. 10a shows our hardware setup of the transmitter.

For the UAV, we use one Intel Aero as the main component of RFEye running Ubuntu. Complex digital samples, yk[n] are acquired using a USRP B205 mini with a single antenna mounted on the chassis as shown in FIG. 10b. The signal is sampled at 5, 10 and 20 MHz and streamed to the RAM disk memory over USB 3.0. The UAV hovers within a sphere of 1 m radius and we conduct flight experiments in both windy and calm days to show the performance in all possible scenarios. The USRP B205 mini is suitable for its small form factor but has a lower resolution of ADC (12-bit) and higher noise floor (≈8 dB), compared to off-the-shelf Wi-Fi access points, typically between 2-4 dB. The B205-mini is powered by the UAV battery with the additional accessories mounted on the chassis as shown in FIG. 10b. The total additional payload is approximately 5 oz. and achieved an average flight time of 15 minutes.

8.2 UAV Positioning System

Coordinates of the UAV, posk is obtained by the Real-time kinematic (RTK) positioning system. RTK is used to enhance the precision of the fix derived from global navigation and satellite systems like GPS, GLONASS, etc. It combines the phase of the GNSS carrier, its information content and the signal from a reference station to provide real-time correction that yields centimeter level accuracy of the fix. With the advent of low cost RTK receivers like CUAV C-RTK GPS, Drotek XL RTK GPS, etc. supported by open source community, it has become essential for precise navigation of UAVs. Although many off-the-shelf modules exist, SparkFun GPS-RTK Board based on u-blox NEO- M8P-2 module is best suited for its small form factor and ease of use. This unit reports GPS location with a precision of 1cm and accuracy of 2.5 cm, but may vary as seen in FIG. 9c. FIG. 10c shows the RTK-GPS setup used as the base connected to a laptop. A similar setup acts as rover, connected to on-board Raspberry Pi.

Figure 11:
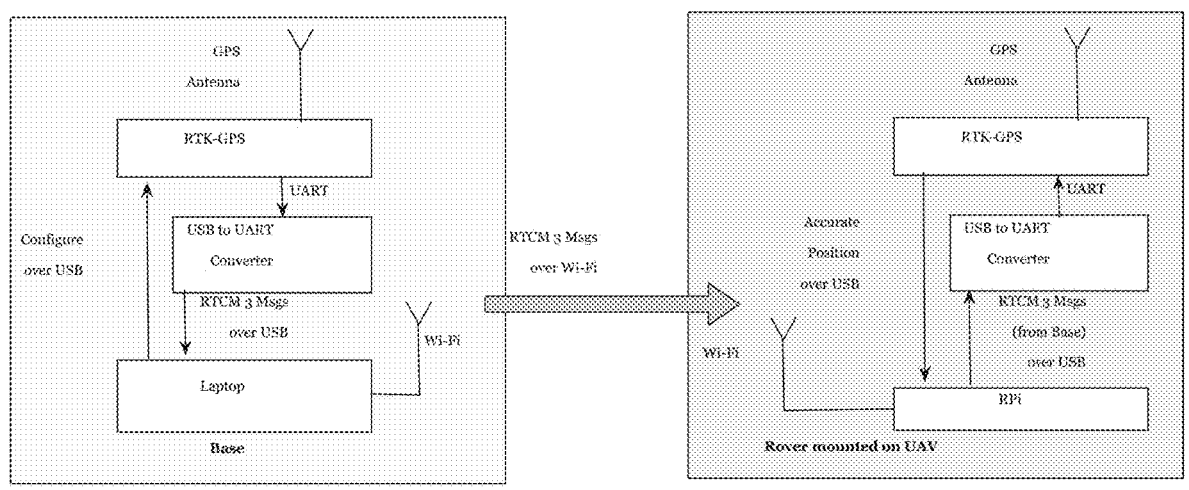
FIG. 11 shows an RTK setup block diagram, according to embodiments of the disclosure.

FIG. 11 shows the block diagram of the base and the rover units in our setup. The base is the static unit, which transmits phase correction stream over a direct Wi-Fi link to the rover mounted on the UAV. The base unit is configured to transmit RTCM (Radio Technical Commission for Maritime Services) v3 messages that the rover forwards to the RTK-GPS unit, which calculates high precision location. We use a laptop for the base and a Raspberry Pi as the rover due to its small size and powered it with an on-board battery. The Raspberry Pi stores the coordinates and the GPS time as a tuple during the flight, which is used for DoA calculation.

8.3 Total Time for Localization

The time taken by RFEye to determine the location of the source is determined by: 1) the time for signal acquisition, and 2) the processing time. However, the processing time is negligible compared to the signal acquisition time, due to the logarithmic run time complexity of RFEye in Section 7. The time for signal acquisition is determined by: a) the time required to capture the signal at each position, and b) the traversal time of the UAV. The duration of a Non-High Throughput (Non-HT) legacy Wi-Fi short preamble is only 8 μs, while the duration of a standard preamble in LoRa transmission with a spreading factor of 7 is 10 ms. Therefore, for the experimentation, an effective packet capture time of 10 ms suffices for each position of the UAV to capture either Wi-Fi or LoRa preambles. The time required to capture N such signal instances for DoA estimation at each position is given by 10N ms and is in the order of milliseconds. Thus, the total duration of the signal captured at two locations is 2×10N=20N ms. For example, for N=20, the total duration of the captured signal is only 20×20=400 ms. The UAV traversal time is determined by the time to travel to each reception position within a sphere of radius R at each location and the time to traverse from one location to another which are separated by a distance d, as shown in FIG. 1. In practice since d>>R, the total traversal time is determined by d and for a UAV traversing at a speed of v, this time is given by d/v and is in the order of seconds. Therefore, the total time required for localization is d/v, which represents the theoretical minimum amount of time required by RFEye to locate a source. For example, for DoA estimation and localization from two locations separated by d=20 meters for a UAV traversing at a nominal velocity of 10 m/s, the total time for localization is ≈d=2 seconds.

9 Evaluation

The performance of RFEye is investigated with varying parameters in different scenarios. We present the results in four categories: 1) Exploring the internal parameter space, 2) Evaluating the external factors, 3) DoA and location accuracy for a Wi-Fi transmitter and 4) Localizing a LoRa transmitter. For the evaluation using Wi-Fi signals, we used non-high throughput legacy preamble at 20 MHz bandwidth (unless otherwise specified). The total number of reception points, N for each location is fixed at 20 for all experiments.

9.1 Impact of Internal Parameters

Figure 12C:
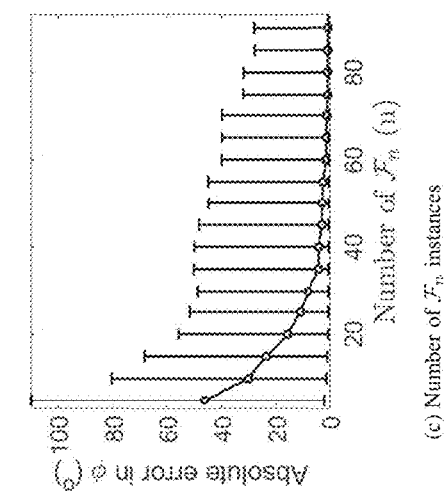
FIGS. 12A-12C shows an impact of tunable parameters on DoA accuracy at SNR=11 dB and BW=20 MHz. Specifically.
Figure 12B:
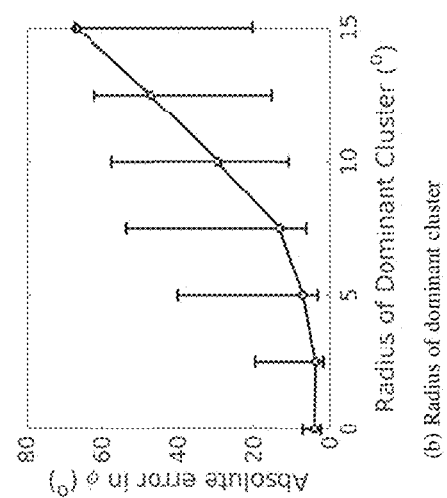
Figure 12A:
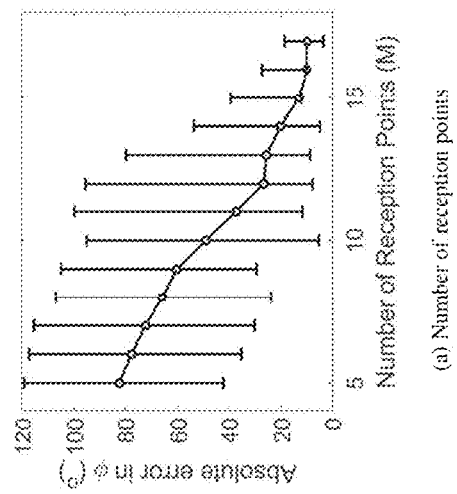

In this experiment, the UAV hovers≈20 m away from the source such that the average received SNR of the signals about 11 dB. The purpose of this experiment is to evaluate the role of various parameters in RFEye at moderately low SNR. We discard all the signals captured ≤10.5 dB and ≥11.5 dB. FIG. 12 shows the error in DoA for different tunable parameters of RFEye. FIG. 12a shows the effect of increasing number of reception points M on DoA accuracy with a median error of <6° in azimuth at moderately low SNR with M=16. We notice a diminishing return beyond 16 points and therefore can be kept constant for resource constrained UAV. The effect of the radius of the dominant cluster on the accuracy of the DoA is shown in FIG. 12b. Clearly, the DoA accuracy improves with decreasing radius, which is also used as termination condition in Algorithm 1. The figure shows a median error of <6° when the radius is 5° and no significant improvement in the DoA accuracy is observed below this radius. Hence, the threshold for the radius of the dominant cluster in Algorithm 1 is set to Rth=5°. FIG. 12c shows the improvement in DoA accuracy with the number of iterations n in Algorithm 1, when M varies from N/2=10 to N−2=18. This indicates that N varies from=184, 756 to (20/18)=190. Results show that the median error in DoA reduces from 45° without any clustering to <5° by clustering the DoA from 40 random instances of Fn for each M. A diminishing return is observed beyond 40 and hence Nmax in Algorithm 1 for each M is set to 40.

9.2 Impact of the External Factors

Figure 13C:
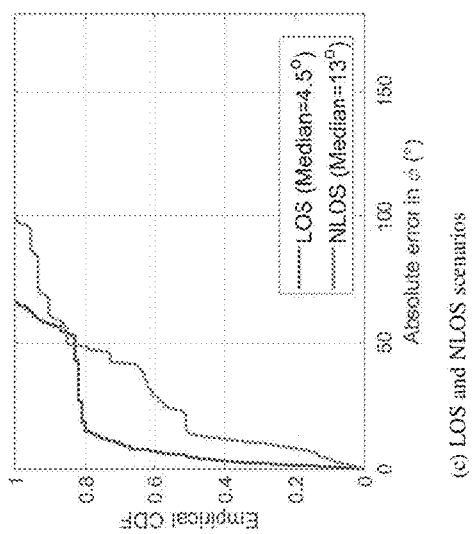
FIGS. 13A-13C show an impact of external parameters on the DoA accuracy. SNR=14 dB, BW=20 MHz. Specifically.
Figure 13B:
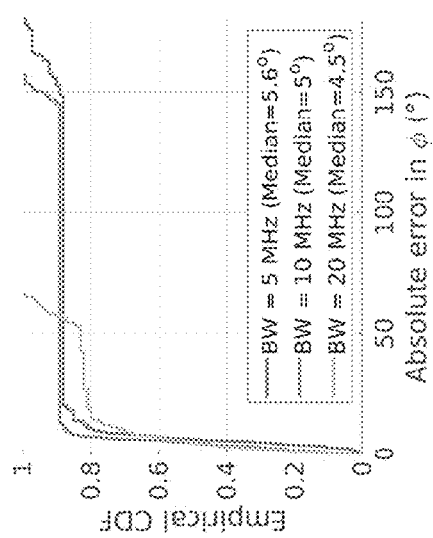
Figure 13A:
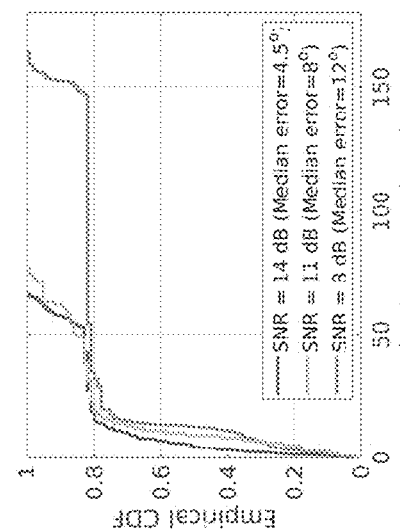

Here, we evaluate RFEye with various parameters that are external to the system like Bandwidth, SNR and NLOS. These are properties of the signal that cannot be controlled and FIG. 13 shows the performance with these parameters. For these experiments M varies from 10 to 18 and Rth=5°. FIG. 13a shows that RFEye achieves a median accuracy of 4.5°, 8° and 12° at SNR of 14 dB, 11 dB and 8 dB respectively with line of sight to the transmitter. Although there is a higher error at low SNR, we believe that it provides a wider direction for the UAV, which can be used to fly towards the target to improve the SNR and the DoA accuracy. Generally, wider signal bandwidth leads to higher accuracy in temporal alignment and DoA. RFEye is evaluated at 14 dB SNR and line-of-sight for three different bandwidths: 5, 10 and 20 MHz, which are also part of the IEEE 802.11a standard. FIG. 13b shows a median DoA accuracy of 4.5° for a 20 MHz signal and 5.6° for 5 MHz signal. This also shows that the effect of bandwidth of the signal on the DoA accuracy is small. Moreover, the 75th percentile error in DoA estimates are 9°, 13° and 14.5° at SNRs of 14 dB, 11 dB and 8 dB respectively as seen in FIG. 13a. In FIG. 13b, the 75th percentile error in DoA is 9° for a 20 MHz signal and 7.2° for 5 MHz signal. These results corroborate the reliability of the DoA estimates of RFEye and the robustness to the external factors in outdoor environments.

Localization in outdoor is often presented with non-line-of-sight (NLOS) scenarios. We compared the performance of RFEye in NLOS by flying the UAV behind large evergreen trees that provides a strong shadowing effect. We notice a drop in SNR of 5 dB in NLOS compared to LOS for the same distance between the target and UAV. FIG. 13c shows the error in angle estimation in NLOS compared to LOS. The median error of 13° in a highly blocked low SNR demonstrates that RFEye is efficient in outdoor scenarios.

9.3 Accuracy of Wi-Fi Localization

Figures 14A, 14B, 14C, 14D:
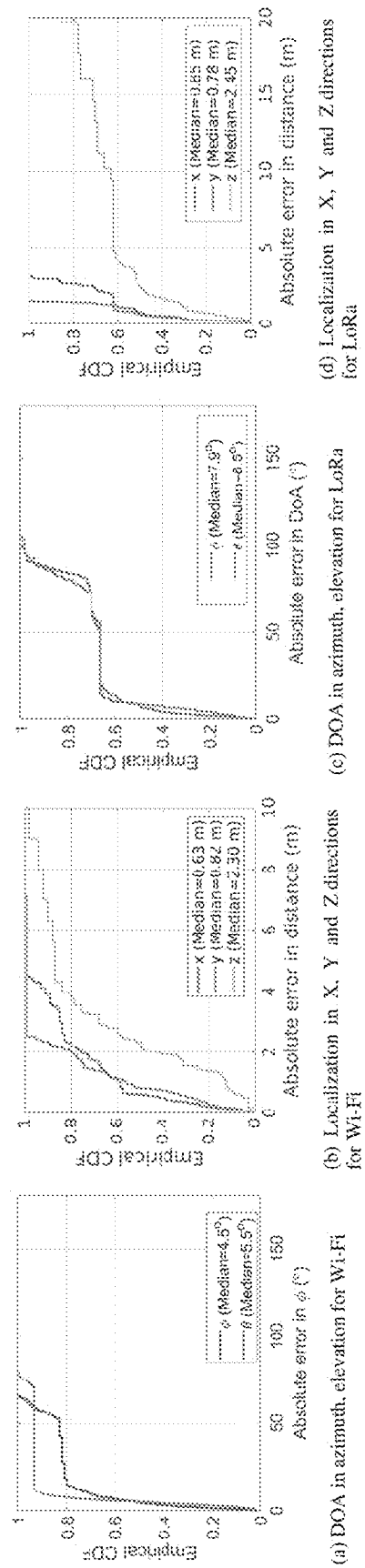
FIGS. 14A-14D show an accuracy of RFEye for wi-fi and LoRa signals. Specifically, FIG. 14A show DoA in azimuth, elevation for Wi-Fi.

The accuracy of the azimuth and elevation angles and the location estimates are evaluated at an SNR of 14 dB with 20 reception points and a threshold radius of 5°, across 1000 experimental trials. FIG. 14a shows a median error of 4.5° and 5.5° and a 75th percentile error of 9° and 7° for azimuth and elevation respectively. FIG. 14b shows a median accuracy of 0.63 m, 0.82 m and 2.3 m in X, Y and Z directions. Position error is calculated as $\sqrt{(\Delta_x^2+\Delta_y^2)}$, which indicates a median error of 1.03 m in 2D, and as $\sqrt{(\Delta_x^2+\Delta_y^2+\Delta_z^2)}$ indicating an error of 2.5 m in 3D. The figure also demonstrates a 75th percentile localization accuracy of 1.8 m, 1.4 m and 3.1 m in X, Y and Z directions, and consequently the location accuracy is less than or equal to 2.2 m in 75% of the trials. These results show the high reliability of the location estimates of a 20 MHz signal from RFEye compared to other source-localization literature shown in Table 1.

9.4 Accuracy of LoRa Localization

We also demonstrate the generality of RFEye using a LoRa transmitter as an example. We use an Adafruit Feather M0 LoRa module to periodically transmit a LoRa packet with the standard preamble at a frequency of 915 MHz, bandwidth of 125 KHz and a spreading factor of 7. The same UAV setup is used to capture the LoRa signals at 20 reception points. FIG. 14c shows a median error of 7.9° and 8.5° in the azimuth and elevation angles respectively at an SNR of 30 dB. FIG. 14d shows the error in the transmitter localization in x, y and z directions. RFEye achieves a median accuracy of 0.85 m, 0.78 m and 2.45 m in x, y and z directions, which indicates a median position error of 1.15 m in 2D and 2.70 m in 3D. This shows that RFEye can accurately localize an RF source transmitting any generic waveform with a repetitive pattern.

9.5 Impact of UAV Altitude

Figures 15A, 15B:
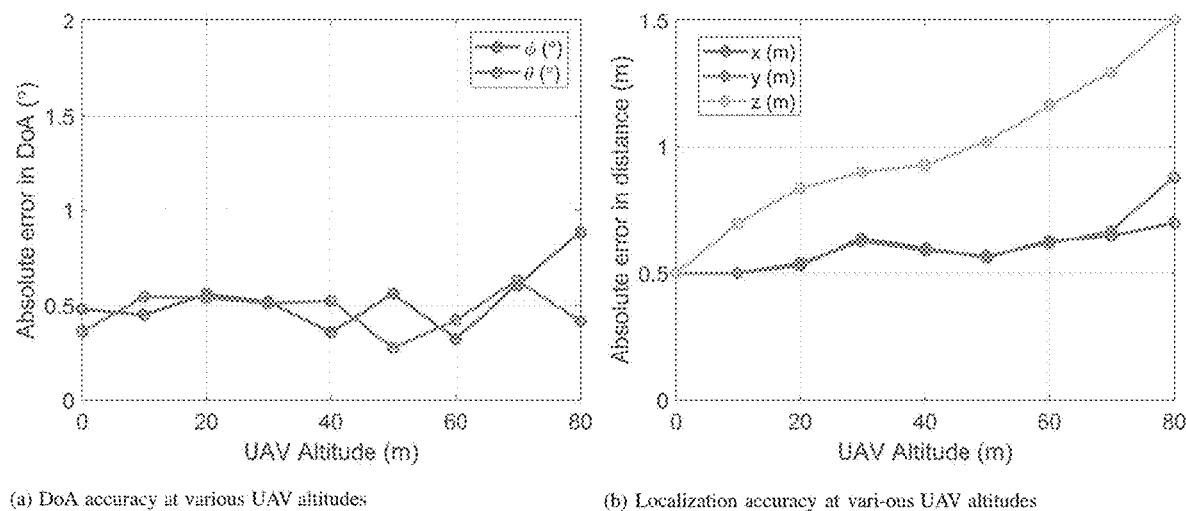
FIGS. 15A and 15B show accuracy of RFEye with UAV altitude. More specifically.

The experiments were conducted at relatively low altitudes due to the following practical constraints: a) restrictions imposed by the Federal Aviation Administration (FAA) mandate the maximum altitude for experiments conducted with small UAVs, which are further limited at locales close to airports, and b) the low transmit power of the source (USRP B210) and high noise floor of the receiver (USRP B205) also limit the maximum altitude at which the signal can be decoded for localization. Therefore, the performance of RFEye is investigated at varying altitudes of the UAV using a robust simulation environment. For the evaluation, a Wi-Fi source emitting a non-high throughput legacy preamble at 20 MHz bandwidth using an omnidirectional antenna is employed as the transmitter. The UAV flies to two random locations at various altitudes and hovers within a sphere of radius 1 meter, collect-ing signals using one omnidirectional antenna at various positions within the sphere. The errors in the UAV position measurement are collectively modeled as a random variable posk∈~N (μ, σ2) for all k∈N, with μ=0 and σ2=2.5 cm and a two-ray multipath propagation model is used for the source-to-UAV channel. FIG. 15 shows the median error in DoA estimation and localization at various altitudes of the UAV, by averaging over all SNR (5-15 dB) and angles of the transmitter (φtx, θtx∈[-π, π]). A consistently low FIG. 15a, demonstrating the robustness of DoA estimation using RFEye. FIG. 15b shows that the median localization error in both X and Y directions is 0.5-0.85 m and exhibits minimal variation with the altitude of the UAV. The median error in Z direction marginally increases with increasing altitude of the UAV due to: a) the lower average signal-to-noise ratio at larger altitudes, and b) the inaccuracies in the elevation angle estimates are extrapolated at higher altitudes, i.e., the higher the altitude, the more the elevation angle inaccuracies perturb the Z location. However, we observe that the error in Z location is at most 1.5 m even at an UAV altitude of 80 m.

10 Conclusion

This work presents RFEye, an outdoor localization system using UAV with limited hardware and processing capacity. We leverage the mobility of the UAV to asynchronously capture signals from multiple positions, detect and extract a signature and align those in time to emulate signal reception from a synchronous array to calculate highly accurate DoA. We leverage combinations of signals to expand the candidate DoAs and perform spatial clustering to reduce error. The proposed algorithm has low computational complexity and is robust to various internal and external sources of errors. Finally, we implement RFEye on commodity hardware and demonstrate a median error in location of 1.09 m in 2D and 2.6 m in 3D. Our results also show the generality by locating both LoRa and Wi-Fi signals while immune to factors like wind and position errors. Although the localization accuracy maybe further improved by adding more resources (antennas and devices (UAV swarm)) to increase the dimensionality of the signal space, the signal processing involved in effectively utilizing the higher dimensionality of the signal space is not straightforward and will be investigated in future work.

We introduce RFEye, a generalized technique to locate signals independent of the waveform, using a single Unmanned Aerial Vehicle (UAV) equipped with only one omnidirectional antenna. This is achieved by acquiring signals from uncoordinated positions within a sphere of 1-meter radius at two nearby locations and formulating an asynchronous, distributed receiver beamforming at the UAV to compute the Direction of Arrival (DoA) from the unknown transmitter. A method set forth herein can include, in one embodiment the following: 1) Blind detection and extraction of unique signature in the signal to be localized, 2) Asynchronous signal acquisition and conditioning, 3) DoA calculation by creating a virtual distributed antenna array at UAV and 4) Obtaining position fix of emitter using DoA from two locations. These steps are analyzed for various sources of error, computational complexity and compared with widely used signal subspace-based DoA estimation algorithms. RFEye is implemented using an Intel-Aero UAV, equipped with a USRP B205 software-defined radio to acquire signals from a ground emitter. Practical outdoor experiments show that RFEye achieves a median accuracy of 1.03 m in 2D and 2.5 m in 3D for Wi-Fi, and 1.15 m in 2D and 2.7 m in 3D for LoRa (Long Range) waveforms, and is robust to external factors like wind and UAV position errors.

Additional Information

Additional information and support may be found in the article entitled "RFEye in the Sky," Abdul Careem et al., IEEE, 18 Nov. 2020 (https://ieeexplore.ieee.org/document/9263339) which is accessible with use of the Hypertext Transfer Protocol Secure protocol URL locator followed by "ieeexplore.ieee.org/document/9263339".

A small sample of combinations set forth herein and in U.S. Provisional Application No. 63/175,324 filed Apr. 15, 2021, titled "Systems, Methods, and Program Products for Determining Location of Unknown Wireless Transmitters", which is incorporated by reference herein in its entirety, include the following: (A1) A computer implemented wireless receiver system, comprising at least one computer processor in data communication with one or more non-transitory computer-readable media comprising computer software configured to execute operation of the computer implemented wireless receiver system and to determine a location of one or more unknown wireless signal transmitters, independent of waveform, when the computer software is executed on the at least one computer processor, the computer implemented wireless receiver system comprising: one or more motile, mobile or portable wireless receiver antenna platforms, each wireless receiver antenna platform equipped with one or more wireless receiver antennas electrically connected to a power supply; one or more position sensors, wherein the wireless receiver system uses the position sensors to measure, record, and track a position of the wireless receiver antenna platforms; code executing detection and acquisition, by the wireless receiver system, of one or more signals emitted by the one or more unknown wireless signal transmitters, wherein the wireless receiver system executes detection and acquisition of the signal from two or more uncoordinated, or non-precalculated, positions located within one or more volumes defined by the wireless receiver system; code executing emulation of a distributed virtual phased receiver antenna array that combines one or more measured positions of the one or more wireless receiver antenna platforms or wireless receiver antennas and temporal realignment of each of the one or more signals to compute a beamforming pattern for the respective signal; code executing computation, by the wireless receiver system, of an asynchronous distributed receiver beamforming pattern along an azimuth and an elevation at the one or more motile, mobile or portable antenna platforms; and code executing calculation of a direction of arrival (DoA), based on the asynchronous distributed receiver beamforming pattern, for each of the one or more signals emitted from each of the one or more unknown wireless signal transmitters; (A2) The wireless receiver system of (A1), additionally comprising: code executing blind detection and extraction, by the wireless receiver system, of one or more unique signatures or repetitive or periodic patterns embedded within or formed by the one or more signals; code executing asynchronous acquisition of the one or more signals, performed by measuring one or more parameters of the one or more signals at the two or more uncoordinated positions; code executing temporal reconstruction and sequence realignment of the one or more signals based on the one or more unique signatures or repetitive or periodic patterns of the one or more signals; and code executing calculation of the DoA for each of the one or more signals, further performed by constructing a virtual distributed wireless receiver antenna array based on placement of one or more of the wireless receiver antennas at the two or more uncoordinated positions and determining a direction of maximum accumulated power within the beamforming pattern and the direction of arrival (DoA), based on the asynchronous distributed receiver beamforming pattern; (A3) The wireless receiver system of (A1), additionally comprising: code executing calculation of at least one of a position fix, a set of coordinates, or a direction and a distance for each of the one or more wireless signal transmitters based on the DoA calculated for each of the one or more signals; and code executing error analysis and correction of the position fix or direction and the distance calculated for each of the one or more wireless signal transmitters; (A4) The wireless receiver system of (A3), wherein the error analysis and correction of the position fix or the direction and the distance calculated for each of the one or more wireless signal transmitters based on the calculated DoA for each of the one or more signals, the error analysis and correction including: code executing collection of a plurality of signal samples from the signals detected and acquired at the two or more uncoordinated, or non-precalculated, positions within two or more volumes; code executing generation of plurality of candidate directions of arrival (DoAs) by combining one or more portions of two or more of the plurality of signal samples collected from the signals detected and acquired within a given volume; code executing generation of a plurality of random or arbitrary clusters of the generated candidate DoAs; code executing calculation of a median candidate DoA for each cluster of the generated plurality of clusters; code executing calculation of a standard deviation for each median candidate DoA as compared to all candidate DoAs in a given cluster; code executing selection of the median candidate DoA having the smallest standard deviation as the computed DoA for a given volume; code executing the repetition of the preceding steps for two or more given volumes to generate a set of smallest standard deviation median candidate DoAs from each volume location; code executing calculation, via one or more of direction finding, true-range multilateration, pseudorange multilateration, hyperbolic positioning, true-range multiangulateration and pseudorange multiangulateration, based on the set of smallest standard deviation median candidate DoAs, of one or more of a location of and a direction and distance to the unknown wireless signal transmitter; (A5) The wireless receiver system of (A4), wherein the error analysis and correction of the position fix or the direction and the distance calculated for each of the one or more wireless signal transmitters includes: code executing calculation of a power of transmission for the unknown wireless signal transmitter, based on one or more of location of and distance and direction to the unknown wireless signal transmitter; code executing identification of the signal transmitted from the unknown wireless signal transmitter and assignment of an identifier to the signal; and code executing tracking of the identified signal through any further movements of the wireless receiver antenna platforms; (A6) The wireless receiver system of (A1), wherein the wireless receiver antennas further comprise omnidirectional antennas; (A7) The wireless receiver system of (A1), wherein the one or more motile, mobile or portable wireless receiver antenna platforms further comprises a single motile, mobile or portable wireless receiver antenna platform; (A8) The wireless receiver system of (A7), wherein the single motile, mobile or portable wireless receiver antenna platform further includes a solitary wireless receiver antenna; (A9) The wireless receiver system of (A1), wherein one or more of the motile, mobile or portable wireless receiver antenna platforms further include a solitary wireless receiver antenna; (A10) The wireless receiver system of (A1), wherein one or more of the motile, mobile or portable wireless receiver antenna platforms further comprise one or more of autonomous or remote-controlled robots, drones, unmanned vehicles, autonomous vehicles and other motile, mobile or portable crafts; (A11) The wireless receiver system of (A1), wherein one or more of the volumes defined by the wireless receiver system are spherical volumes of between 0.5 meters and 30 meters in diameter; (A12) The wireless receiver system of (A1), wherein one or more of the volumes defined by the wireless receiver system are spherical volumes of between 1 meter and 10 meters in diameter; (A13) The wireless receiver system of (A1), wherein one or more of the volumes defined by the wireless receiver system are spherical volumes that have a 1-meter radius; (A14) The wireless receiver system of (A1), wherein the one or more positioning sensors further comprise one or more of geospatial positioning sensors, real time kinematic sensors, precise point positioning sensors and inertial sensors, wherein the inertial sensors further include one or more of inertial measurement units, motion sensors, accelerometers, velocimeters or other speed gauges, gyroscopes and magnetometers; (A15) The wireless receiver system of (A1), wherein the asynchronous distributed receiver beamforming pattern along the azimuth and the elevation is computed at one of: each degree of a 360-degree arc of the azimuth and the elevation, or a predetermined number of degrees of the 360-degree arc of the azimuth and the elevation, the predetermined number of degrees being less than 360 degrees; (B1) A method for operating a wireless receiver system and determining a location of one or more unknown wireless signal transmitters, independent of waveform, wherein various process steps of the method are executed by one or more computers, comprising at least one computer processor in data communication with one or more non-transitory computer-readable media containing computer software code comprising computer-readable instructions that, when executed by the at least one computer processor, are configured to operate the wireless receiver system and determine the location of one or more unknown wireless signal transmitters, the steps of the method comprising: providing one or more motile, mobile or portable wireless receiver antenna platforms, each wireless receiver antenna platform equipped with one or more wireless receiver antennas electrically connected to a power supply; optionally, mapping or cataloging a set of one or more zones, e.g., areas or volumes, of interest prior to performing a signal localization protocol; transporting one or more of the motile, mobile or portable wireless receiver antenna platforms to one or more first zones of interest and performing the signal localization protocol; optionally, transporting one or more of the motile, mobile or portable wireless receiver antenna platforms to one or more additional zones of interest and repeating performance of the signal localization protocol at each of the one or more additional zones of interest, which process may be repeated any number of subsequent times, wherein the signal localization protocol comprises: placing each of the motile, mobile or portable wireless receiver antenna platforms at two or more points of interest, comprising a first, second and subsequent points of interest, within the first zones of interest and within any of the additional zones of interest, and at each point of the interest, executing signal acquisition and localization, including: detecting and acquiring, by the wireless receiver system, a set of one or more signals emitted by the one or more unknown wireless signal transmitters; measuring and tracking a position of the wireless receiver antenna platforms using one or more position sensors; emulating, by the wireless receiver system, a distributed virtual phased receiver antenna array that combines one or more measured positions of the one or more wireless receiver antenna platforms or wireless receiver antennas and temporal realignment of each of the one or more signals to compute a beampattern for the respective signal; computing, by the wireless receiver system, an asynchronous distributed receiver beamforming pattern along an azimuth and an elevation at the one or more motile, mobile or portable antenna platforms; calculating a direction of arrival (DoA), based on the asynchronous distributed receiver beamforming pattern, for each of the one or more signals emitted from each the one or more unknown wireless signal transmitters; and integrating one or more prior signal localization measurements from each of a set of one or more zones of interest, wherein the signal localization protocol has been previously performed at each zone of interest included in the set; (B2) The method of (B1), wherein the signal localization protocol further includes method steps comprising: calculating an energy envelope or signature to noise ratio (SNR) of the signal; extracting a first set of samples of the signal energy envelope or SNR above a set threshold, wherein the number of samples in the first set is selected to ensure that the signal sample contains at least one instance of a repeating pattern in an arbitrary waveform; cross-correlating the energy envelope of the signal with the signal to identify and determine a set of exact indexes for the unique signature or repetitive or periodic pattern of the signal and a set of two consecutive samples of the signal, from a set of all consecutive signal samples taken at one or more of the points of interest within the first and any subsequent additional zones of interest, having a lowest index value and a second lowest index value, respectively, at which the normalized cross-correlation exceeds a set threshold; cross correlating the repetitive or periodic pattern with the signal to extract a unique signature of the signal, using the lowest index value signal sample and a highest index signal sample value at which the normalized cross-correlation exceeds a set threshold; realigning in time or correcting the temporal sequence of all asynchronously received signals, partial signals or signal traces, performing wireless receiver beamforming analytics and calculating the DoA; (B3) The method of (B1), wherein the signal localization protocol further includes method steps comprising: blind detecting and extracting, by the wireless receiver system, of one or more unique signatures or repetitive or periodic patterns embedded within or formed by the one or more signals; asynchronous acquiring of the one or more signals, performed by measuring one or more parameters of the one or more signals at the two or more uncoordinated positions; reconstructing a time sequence or temporally realigning the one or more signals based on the one or more unique signatures or repetitive or periodic patterns of the one or more signals; and calculating the DoA for each of the one or more signals, further performed by constructing a virtual distributed wireless receiver antenna array based on placement of one or more of the wireless receiver antennas at the two or more uncoordinated positions and determining a direction of maximum accumulated power within the beamforming pattern and the direction of arrival (DoA), based on the asynchronous distributed receiver beamforming pattern; (B4) The method of (B1), wherein the signal localization protocol further includes method steps comprising: calculating a position fix, a set of coordinates or a direction and distance vector for each of the one or more wireless signal transmitters based on the DoA calculated for each of the one or more signals; and analyzing and correcting one or more error parameters present within the set of coordinates, position fix or direction and distance vector calculated for each of the one or more wireless signal transmitters; (B5) The method of (B1), wherein the analyzing and correcting the one or more error parameters present within the at least one of the set of coordinates, position fix or the direction and the distance calculated for each of the one or more wireless signal transmitters based on the calculated DoA for each of the one or more signals, the analyzing and correcting further including: collecting a plurality of signal samples from the signals detected and acquired at the two or more uncoordinated, or non-precalculated, positions within two or more volumes; generating a plurality of candidate directions of arrival (DoAs) by combining one or more portions of two or more of the plurality of signal samples collected from the signals detected and acquired within a given volume; generating a plurality of random or arbitrary clusters of the generated candidate DoAs; calculating a median candidate DoA for each cluster of the generated plurality of clusters; calculating a standard deviation for each median candidate DoA as compared to all candidate DoAs in a given cluster; selecting the median candidate DoA having the smallest standard deviation as the computed DoA for a given volume; repeating the preceding steps for two or more given volumes to generate a set of smallest standard deviation median candidate DoAs from each volume location; and calculating, via one or more of direction finding, true-range multilateration, pseudorange multilateration, hyperbolic positioning, true-range multiangulateration and pseudorange multiangulateration, based on the set of smallest standard deviation median candidate DoAs, one or more of a location of and a direction and distance to the unknown wireless signal transmitter; (B6) The method of (B5), wherein the error analysis and correction of the position fix or the direction and the distance calculated for each of the one or more wireless signal transmitters includes: calculating power of the unknown wireless signal transmitter, based on one or more of location of and distance and direction to the unknown wireless signal transmitter; identifying the signal transmitted from the unknown wireless signal transmitter and assigning an identifier to the signal; and tracking the identified signal through any further movements of the wireless receiver antenna platforms; (B7) The method of (B1), wherein one or more of the wireless receiver antennas further comprise omnidirectional antennas; (B 8) The method of (B1), wherein the one or more motile, mobile or portable wireless receiver antenna platforms further comprises a single motile, mobile or portable wireless receiver antenna platform; (B9) The method of (B8) wherein the single motile, mobile or portable wireless receiver antenna platform further includes a solitary wireless receiver antenna; (B10) The method of (B1), wherein one or more of the motile, mobile or portable wireless receiver antenna platforms further include a solitary wireless receiver antenna; (B11) The method of (B1), wherein one or more of the motile, mobile or portable wireless receiver antenna platforms further comprise one or more of autonomous or remote-controlled robots, drones, unmanned vehicles, autonomous vehicles and other motile, mobile or portable crafts; (B12) The method of (B1), wherein the step of detecting and acquiring the set of one or more signals for signal acquisition and localization includes detecting and acquiring, by the wireless receiver system, each signal from two or more uncoordinated, or non-pre-calculated, positions located within one or more volumes defined by the wireless receiver system; wherein one or more of the volumes defined by the wireless receiver system are spherical volumes of between 0.5 meters and 30 meters in diameter; (B13) The method of (B12), wherein one or more of the volumes defined by the wireless receiver system are spherical volumes of between 1 meter and 10 meters in diameter; (B14) The method of (B12), wherein one or more of the volumes defined by the wireless receiver system are spherical volumes that have a 1-meter radius; (B15) The method of (B1), wherein the one or more positioning sensors further comprise one or more of geospatial positioning sensors, real time kinematic sensors, precise point positioning sensors and inertial sensors, wherein the inertial sensors further include one or more of inertial measurement units, motion sensors, accelerometers, velocimeters or other speed gauges, gyroscopes and magnetometers; (B16) The method of (B1), wherein the asynchronous distributed receiver beamforming pattern along the azimuth and the elevation is computed at one of: each degree of a 360-degree arc of the azimuth and the elevation, or a predetermined number of degrees of the 360-degree arc of the azimuth and the elevation, the predetermined number of degrees being less than 360 degrees.

A small sample of combinations set forth herein and in U.S. Provisional Application No. 63/175,324 filed Apr. 15, 2021, titled "Systems, Methods, and Program Products for Determining Location of Unknown Wireless Transmitters", which is incorporated by reference herein in its entirety, include the following: (C1) A method comprising: receiving by a movable receiver moving within a first location a plurality of signal instances of a signal emitted by a transmitter, wherein signal instances defining the plurality of signal instances are collected by the moveable receiver at different respective receiver positions within the first location; and discovering, for the first location, a direction of arrival parameter value that specifies a direction of arrival of the signal emitted by the transmitter, wherein the discovering includes using a set of signal instances from the plurality of signal instances. (C2) The method of (C1), wherein the method includes repeating the receiving and the discovering at a second location, and determining a location of the transmitter using the direction of arrival parameter value discovered for the first location and the direction of arrival parameter value discovered for the second location. (C3) The method of (C1), wherein signal instances defining the plurality of signal instances are asynchronously collected by the moveable receiver at different respective receiver positions within the first location. (C4) The method of (C1), wherein the discovering includes finding a beam direction yielding maximum received energy. (C5) The method of (C1), wherein the discovering includes aligning in time signal instances defining the set of signal instances. (C6) The method of (C1), wherein the discovering includes aligning in time signal instances defining the set of signal instances, and wherein the discovering includes finding a beam direction yielding maximum received energy. (C7) The method of (C1), wherein the discovering includes aligning in time signal instances defining the set of signal instances, the aligning including extracting a signature from the signal instances and aligning the signatures of the respective signal instances defining the set of signal instances. (C8) The method of (C1), wherein the discovering includes evaluating a returned energy from multiple beam directions and selecting among the evaluated beam directions the beam direction yielding maximum received energy. (C9) The method of (C1), wherein the discovering includes evaluating a returned energy from multiple beam directions and selecting among the evaluated beam directions the beam direction yielding maximum received energy, wherein the evaluating the returned energy from multiple beam directions includes ascertaining a contribution from respective receiver positions associated to the set of signal instances. (C10) The method of (C1), wherein the discovering includes evaluating a returned energy from multiple beam directions and selecting among the evaluated beam directions the beam direction yielding maximum received energy, wherein the evaluating the returned energy from multiple beam directions includes ascertaining a contribution from respective receiver positions associated to the set of signal instances, the ascertaining including applying beamforming weights for the respective receiver positions, the beamforming weights being determined using position parameter values specifying the respective receiver positions. (C11) The method of (C1), wherein the discovering includes aligning in time signal instances defining the set of signal instances, the aligning including extracting a signature from the signal instances and aligning the signatures of the respective signal instances defining the set of signal instances, wherein the discovering includes finding a beam direction yielding maximum received energy, wherein the discovering includes evaluating a returned energy from multiple beam directions and selecting among the evaluated beam directions the beam direction yielding maximum received energy, wherein the evaluating the returned energy from multiple beam directions includes ascertaining a contribution from respective receiver positions associated to the set of signal instances, the ascertaining including applying beamforming weights for the respective receiver positions, the beamforming weights being determined using position parameter values specifying the respective receiver positions. (C12) The method of (C1), wherein the method includes finding, for the first location, multiple direction of arrival parameter values, including the direction of arrival parameter value. (C13) The method of (C1), wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes employing clustering analysis to select best directions of arrival parameter values from the multiple direction of arrival parameter values. (C14) The method of (C1), wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes subjecting the multiple direction of arrival parameter values to clustering analysis, and determining a direction of arrival of the signal emitted by the transmitter in dependence on the clustering analysis. (C15) The method of (C1), wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes employing clustering analysis to select best direction of arrival parameter values from the multiple direction of arrival parameter values, wherein the method includes providing a first location direction of arrival parameter value using the clustering analysis based on the selected best direction of arrival parameter values, repeating the finding for the second location to provide a second location direction of arrival parameter value, and deriving a location of the transmitter using the first location direction of arrival parameter value and the second location direction of arrival parameter value. (C16) The method of (C1), wherein the discovering employs an angle of arrival method for performing the discovering. (C17) The method of (C1), wherein the discovering employs an emulated distributed receiver beamforming method for performing the discovering. (C18) The method of (C1), wherein the discovering employs a multiple signal classification (MUSIC) method for performing the discovering. (C19) The method of (C1), wherein the discovering employs a signal parameters via rotational invariance techniques (ESPRIT) method for performing the discovering. (D1) A method comprising: receiving a plurality of signal instances of a signal emitted by a transmitter, wherein respective signal instances of the plurality of signal instances are collected at different positions; and discovering a plurality of direction of arrival parameter values that respectively specify a direction of arrival of the signal emitted by the transmitter, wherein the discovering includes using multiple sets of signal instances from the plurality of signal instances; examining the plurality of direction of arrival parameter values; and determining a direction of arrival of the signal emitted by the transmitter in dependence on the examining (D2) The method of (D1), wherein the examining includes subjecting the plurality of direction of arrival parameter to clustering analysis. (D3) The method of (D1), wherein the examining includes subjecting the plurality of direction of arrival parameter to clustering analysis and wherein the determining includes identifying a dominant cluster amongst multiple clusters, wherein respective clusters of the multiple clusters are defined by sets of direction of arrival parameter values from the plurality of direction of arrival parameter values. (D4) The method of (D1), wherein sets of the multiple sets of signal instances include randomly selected subsets of the plurality of signal instances. (D5) The method of (D1), wherein the discovering a plurality of direction of arrival parameter values that respectively specify a direction of arrival of the signal emitted by the transmitter includes ascertaining first and second direction of arrival parameter values using a single set of the multiple sets of signal instances, wherein the ascertaining includes selecting beam directions having power levels satisfying a power threshold. (D6) The method of (D1), wherein the receiving is performed by a moving receiver that moves over time to varying positions defining the different positions. (E1) A method comprising: receiving by a movable receiver disposed on an unmanned aerial vehicle (UAV) moving within a first location a plurality of signal instances of a signal emitted by a transmitter, wherein signal instances defining the plurality of signal instances are asynchronously collected by the moveable receiver at different respective receiver positions within the first location; and discovering, for the first location, a direction of arrival parameter value that specifies a direction of arrival of the signal emitted by the transmitter, wherein the discovering includes using a set of signal instances from the asynchronously collected plurality of signal instances, aligning in time signal instances defining the set of signal instances, and identifying a beam direction yielding maximum received energy. (E2) The method of (E1), wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes subjecting the multiple direction of arrival parameter values to clustering analysis, and determining a direction of arrival of the signal emitted by the transmitter in dependence on the examining. (F1) A system comprising: at least one computer processor in communication with one or more computer-readable media comprising computer software configured to execute operation of the system for performance of the method comprising: receiving by a movable receiver moving within a first location a plurality of signal instances of a signal emitted by a transmitter, wherein signal instances defining the plurality of signal instances are collected by the moveable receiver at different respective receiver positions within the first location; and discovering, for the first location, a direction of arrival parameter value that specifies a direction of arrival of the signal emitted by the transmitter, wherein the discovering includes using a set of signal instances from the plurality of signal instances. (F2) The system of (F1), wherein the method includes repeating the receiving and the discovering at a second location, and determining a location of the transmitter using the direction of arrival parameter value discovered for the first location and the direction of arrival parameter value discovered for the second location.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It should be appreciated that all combinations of the foregoing concepts and additional concepts discussed in greater detail below (provided such concepts are not mutually inconsistent) are contemplated as being part of the subject matter disclosed herein at least to achieve the benefits as described herein. In particular, all combinations of claims subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely provided by way of example. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of the term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph (35 U.S.C. § 112(f)), unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements, it will be understood that the subject matter can be practiced with less than or greater than the certain number of elements. Accordingly, the subject matter is not to be seen as limited by the foregoing description, but is only limited by the scope of the appended claims

What is claimed is:

1. A method, comprising:
receiving by a movable receiver moving within a first location a plurality of signal instances of a signal emitted by a transmitter, wherein signal instances defining the plurality of signal instances are collected by the moveable receiver at different respective receiver positions within the first location;
discovering, for the first location, a direction of arrival parameter value that specifies a direction of arrival of the signal emitted by the transmitter, wherein the discovering includes using a set of signal instances from the plurality of signal instances;
finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances;
subjecting the multiple direction of arrival parameter values to clustering analysis; and
determining a direction of arrival of the signal emitted by the transmitter in dependence on the clustering analysis.

2. The method of claim 1, wherein the method includes repeating the receiving and the discovering at a second location, and determining a location of the transmitter using the direction of arrival parameter value discovered for the first location and the direction of arrival parameter value discovered for the second location.

3. The method of claim 1, wherein signal instances defining the plurality of signal instances are asynchronously collected by the moveable receiver at different respective receiver positions within the first location.

4. The method of claim 1, wherein the discovering includes finding a beam direction yielding maximum received energy.

5. The method of claim 1, wherein the discovering includes aligning in time signal instances defining the set of signal instances.

6. The method of claim 1, wherein the discovering includes aligning in time signal instances defining the set of signal instances, and wherein the discovering includes finding a beam direction yielding maximum received energy.

7. The method of claim 1, wherein the discovering includes aligning in time signal instances defining the set of signal instances, the aligning including extracting a signature from the signal instances and aligning the signatures of the respective signal instances defining the set of signal instances.

8. The method of claim 1, wherein the discovering includes evaluating a returned energy from multiple beam directions and selecting in dependence on the evaluating yielding maximum received energy.

9. The method of claim 1, wherein the discovering includes evaluating a returned energy from multiple beam directions and selecting in dependence on the evaluating yielding maximum received energy, wherein the evaluating the returned energy from multiple beam directions includes ascertaining a contribution from respective receiver positions associated to the set of signal instances.

10. The method of claim 1, wherein the discovering includes evaluating a returned energy from multiple beam directions and selecting in dependence on the evaluating yielding maximum received energy, wherein the evaluating the returned energy from multiple beam directions includes ascertaining a contribution from respective receiver positions associated to the set of signal instances, the ascertaining including applying beamforming weights for the respective receiver positions, the beamforming weights being determined using position parameter values specifying the respective receiver positions.

11. The method of claim 1, wherein the discovering includes aligning in time signal instances defining the set of signal instances, the aligning including extracting a signature from the signal instances and aligning the signatures of the respective signal instances defining the set of signal instances, wherein the discovering includes finding a beam direction yielding maximum received energy, wherein the discovering includes evaluating a returned energy from multiple beam directions and selecting in dependence on the evaluating yielding maximum received energy, wherein the evaluating the returned energy from multiple beam directions includes ascertaining a contribution from respective receiver positions associated to the set of signal instances, the ascertaining including applying beamforming weights for the respective receiver positions, the beamforming weights being determined using position parameter values specifying the respective receiver positions, and wherein the movable receiver is disposed on an unmanned aerial vehicle (UAV) moving within a first location.

12. The method of claim 1, wherein the method includes finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances, and wherein the method includes employing clustering analysis to select best direction of arrival parameter values from the multiple direction of arrival parameter values, wherein the method includes providing a first location direction of arrival parameter value using the clustering analysis based on the selected best direction of arrival parameter values, repeating the finding for a second location to provide a second location direction of arrival parameter value, and deriving a location of the transmitter using the first location direction of arrival parameter value and the second location direction of arrival parameter value.

13. The method of claim 1, wherein the discovering employs one or more of the following selected from the group consisting of angle of arrival method for performing the discovering, an emulated distributed receiver beamforming method for performing the discovering, a multiple signal classification (MUSIC) method for performing the discovering, and a signal parameters via rotational invariance techniques (ESPRIT) method for performing the discovering.

14. A method, comprising:
receiving a plurality of signal instances of a signal emitted by a transmitter, wherein respective signal instances of the plurality of signal instances are collected at different positions;
discovering a plurality of direction of arrival parameter values that respectively specify a direction of arrival of the signal emitted by the transmitter, wherein the discovering includes using multiple sets of signal instances from the plurality of signal instances;
examining the plurality of direction of arrival parameter values; and
determining a direction of arrival of the signal emitted by the transmitter in dependence on the examining;
wherein the discovering a plurality of direction of arrival parameter values that respectively specify a direction of arrival of the signal emitted by the transmitter includes ascertaining first and second direction of arrival parameter values using a single set of the multiple sets of signal instances;
wherein the ascertaining includes selecting beam directions having power levels satisfying a power threshold;
wherein the receiving is performed by a moving receiver that moves over time to varying positions defining the different positions; and
wherein sets of the multiple sets of signal instances include randomly selected subsets of the plurality of signal instances.

15. The method of claim 14, wherein the examining includes subjecting the plurality of direction of arrival parameter to clustering analysis.

16. The method of claim 14, wherein the examining includes subjecting the plurality of direction of arrival parameter to clustering analysis and wherein the determining includes identifying a dominant cluster amongst multiple clusters, wherein respective clusters of the multiple clusters are defined by sets of direction of arrival parameter values from the plurality of direction of arrival parameter values.

17. A method, comprising:
receiving by a movable receiver disposed on an unmanned aerial vehicle (UAV) moving within a first location a plurality of signal instances of a signal emitted by a transmitter, wherein signal instances defining the plurality of signal instances are asynchronously collected by the moveable receiver at different respective receiver positions within the first location; and
discovering, for the first location, a direction of arrival parameter value that specifies a direction of arrival of the signal emitted by the transmitter, wherein the discovering includes using a set of signal instances from the asynchronously collected plurality of signal instances, aligning in time signal instances defining the set of signal instances, and identifying a beam direction yielding maximum received energy;
finding, for the first location, multiple direction of arrival parameter values, including the direction of arrival parameter value, specifying a direction of arrival of the signal emitted by the transmitter, wherein the finding includes repeating the discovering using multiple different sets of the signal instances selected from the plurality of signal instances;
subjecting the multiple direction of arrival parameter values to clustering analysis; and
determining a direction of arrival of the signal emitted by the transmitter in dependence on the clustering analysis.

* * * * *